United States Patent [19]
Kawakami et al.

[11] Patent Number: 5,491,305
[45] Date of Patent: Feb. 13, 1996

[54] VIBRATION TRANSMISSION PLATE FOR INPUTTING COORDINATES

[75] Inventors: Tatsuro Kawakami, Yokohama; Yuichiro Yoshimura, Kamakura; Katsuyuki Kobayashi, Yokohama, all of Japan

[73] Assignee: Canon Kabushiki Kaisha, Tokyo, Japan

[21] Appl. No.: 5,213

[22] Filed: Jan. 15, 1993

[30] Foreign Application Priority Data

Jan. 24, 1992 [JP] Japan .................................. 4-011254
Aug. 5, 1992 [JP] Japan .................................. 4-208980

[51] Int. Cl.⁶ .......................... G08C 21/00; G09G 3/02
[52] U.S. Cl. .......................... 178/19; 178/18; 345/177; 345/179
[58] Field of Search ................ 178/18, 19; 345/177, 345/179; 367/907

[56] References Cited

U.S. PATENT DOCUMENTS

| | | | |
|---|---|---|---|
| 4,886,943 | 12/1989 | Suzuki et al. | 178/18 |
| 4,887,245 | 12/1989 | Mori et al. | 367/907 |
| 4,897,511 | 1/1990 | Itaya et al. | 178/18 |
| 4,931,965 | 6/1990 | Kaneko et al. | 364/560 |
| 4,980,518 | 12/1990 | Kobayashi et al. | 345/177 |
| 5,017,913 | 5/1991 | Kaneko et al. | 345/177 |
| 5,019,865 | 5/1991 | Tanaka et al. | 178/18 |
| 5,073,685 | 12/1991 | Kobayashi | 362/907 |
| 5,097,102 | 3/1992 | Yoshimura | 345/177 |
| 5,177,472 | 1/1993 | Taniishi et al. | 345/179 |
| 5,260,521 | 11/1993 | Knowles | 178/18 |

Primary Examiner—Stephen Chin
Assistant Examiner—Vijay Shankar
Attorney, Agent, or Firm—Fitzpatrick, Cella, Harper & Scinto

[57] ABSTRACT

A vibration transmission plate for inputting coodinates has a two-layer structure with an input layer for inputting vibration and a vibration transmission layer for transmitting the vibration. By using a member having a flexural modulus of elasticity of 180.0–720.0 kgf/mm² as the input layer, accuracy in detecting the input position of the vibration can be improved. By forming a member made of glass fibers, which can restrict the direction of the transmission of the vibration between the input layer and the vibration transmission layer as an intermediate layer, the accuracy can also be improved.

20 Claims, 23 Drawing Sheets

θ=90 DEGREES

θ=60 DEGREES

θ=90 DEGREES

θ=60 DEGREES

FLEXURAL MODULUS OF
ELASTICITY OF INPUT LAYER

[Kgf/mm²]

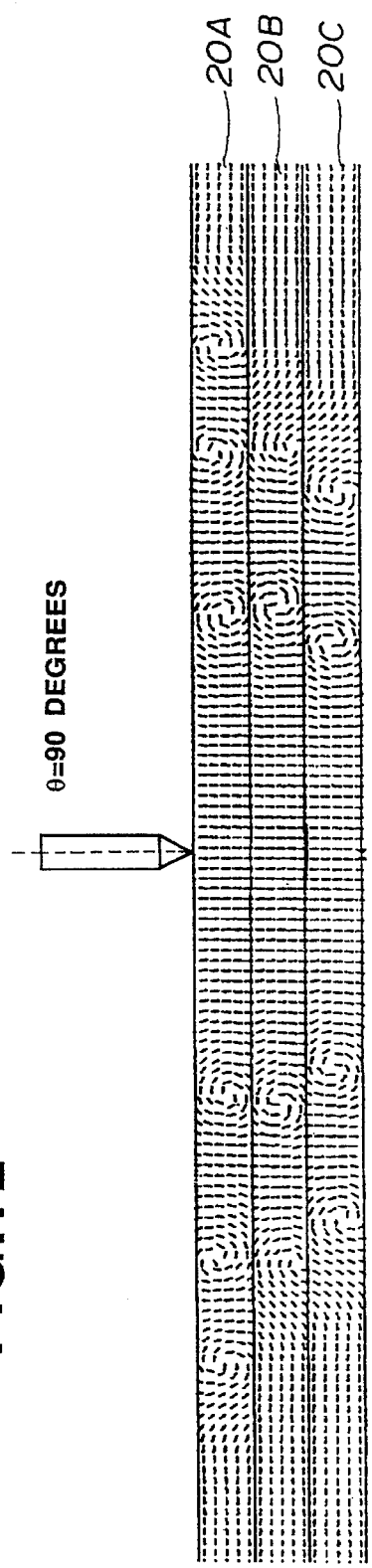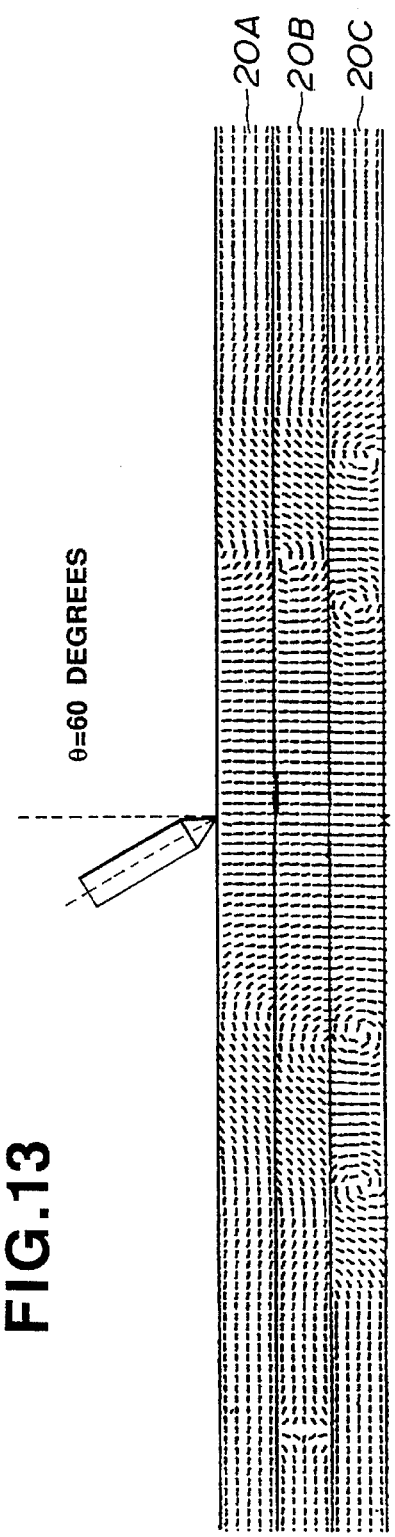
FIG.12
FIG.13

(ATOMIC-ARRANGEMENT PATTERN I)

(ATOMIC-ARRANGEMENT PATTERN II)

θ=90 DEGREES

θ=60 DEGREES

VIBRATION TRANSMISSION PLATE FOR INPUTTING COORDINATES

BACKGROUND OF THE INVENTION

1. Field of the Invention

This invention relates to a coordinate input apparatus, and more particularly to a vibration transmission plate for inputting coordinates used in an apparatus which detects elastic vibration wave input from a vibration input pen by a plurality of sensors provided at the vibration transmission plate. The apparatus also detects the coordinates of the input position of vibration by the vibration input pen based on the transmission time of elastic vibration input from the vibration input pen to the vibration transmission plate.

2. Description of the Related Art

Various types of coordinate input apparatuses for inputting handwritten characters, drawings or the like to an information processing apparatus, such as a computer or the like, have been proposed. Among these types, a type which utilizes the transmission of the vibration of an ultrasonic wave and calculates coordinates by measuring the transmission delay time of the wave has been known to have a simple structure and high reliability. Since a vibration transmission plate can be made of a transparent material, such as plastic, glass or the like, it is possible to provide an information input apparatus, which can be used with high operational feeling as if the user is writing an image on paper, by superposing the vibration transmission plate on a liquid crystal display or the like. The vibration transmission plate used in this type is required to transmit the vibration of the ultrasonic wave input by the vibration input pen to sensors as a plate wave under various kinds of operational environment of the user.

In selecting a material for the vibration transmission plate, glass can be effectively used from the viewpoint of its high transparency and small damping coefficient for vibration. However, if the vibration transmission plate comprises a single glass plate, the detected position changes when the vibration input pen is inclined in the above-described state of using the coordinate input apparatus. This change is caused by a change in the phase of the plate wave propagated in the vibration transmission plate due to a change in the force vector of the vibration input to the glass in accordance with the inclination of the vibrating input pen. As a result, the arrival time of the wave detected by a sensor changes, causing a decrease in accuracy of the detected position.

FIG. 1 is a diagram illustrating the configuration of a model used in order to confirm the performance of the vibration transmission plate. This model comprises a uniform vibration transmission plate made of a single glass plate. In FIG. 1, sensors 6A and 6C are provided at left and right positions relative to the input position of vibration input pen 3 so as to have the same distance therefrom. The two sensors and the input position of vibrating input pen 3 are on the same cross section. FIG. 2 is a diagram illustrating the behavior of vibration waves received by sensors 6A and 6C when vibrating input pen 3 contacts the vibration transmission plate with angles of 90° and 60°, with the abscissa representing time and the ordinate representing the amplitude of the wave.

In FIG. 2, the vibration waves received by sensors 6A and 6C when vibrating input pen 3 contacts the vibration transmission plate with angles $\theta=90°$ and $\theta=60°$ are indicated by a broken line and solid lines, respectively.

The vibration waves received by sensors 6A and 6C differ by inclinating vibrating input pen 3, and time delays occur at points where the vibration waves cross the line representing the amplitude value=0, as indicated within circles shown in FIG. 2. It is known that the time delay, that is, the phase delay $\epsilon$ of the vibration wave occurs when the vibration transmission plate comprises a single layer of a uniform material, which is not limited to glass. If the phase delay $\epsilon$ has a large value, an error in position detection increases when position recognition is performed by an arithmetic and control circuit using signals representing the vibration waves received by sensors 6A and 6C which pass through a signal waveform detection circuit.

In order to remove the influence of the inclination of the vibration input pen, vibration transmission plates having a multilayer structure have been proposed. However, materials for the vibration transmission plate and the configuration of the multilayer structure have not been deeply considered, and there is still room for improvement in accuracy of the detected position.

SUMMARY OF THE INVENTION

It is an object of the present invention to provide a vibration transmission plate for inputting coordinates in which accuracy in the detection of the input position of vibration is improved.

It is a further object of the present invention to provide a vibration transmission plate for inputting coordinates in which by using a glass plate for a vibration propagating layer and limiting the flexural modulus of elasticity of an input layer to a range of 180.0 to 720.0 kgf/mm², the phase delay of a vibration wave produced by inclination of a vibration input pen is reduced, and an error in position detection is thereby reduced.

It is a still further object of the present invention to provide a vibration transmission plate for inputting coordinates in which, by forming a plate (which can propagate vibration) with at least three layers, and contacting the respective layers in an unbonded state, the component of vibrations in a direction perpendicular to the surface of the vibration transmission plate is transmitted mainly to the next layer, and asymmetry in the mode of vibration transmission caused by inclination of a vibration input pen is reduced.

It is still another object of the present invention to arrange vibrations to be input to sensors with the direction of the vibration limited to a predetermined direction by disposing a member having directivity in its direction of vibration transmission as a vibration transmission plate for inputting coordinates.

It is still a further object of the present invention to provide a vibration transmission plate having a multilayer structure comprising an input layer which a vibrating input pen contacts, a vibration propagating layer for propagating vibrations to sensors, and an intermediate layer comprising a member having directivity disposed between the input layer and the vibration propagating layer, and to improve accuracy in position detection by a synergistic effect caused by the directivity of vibration of the multilayer structure and the directivity of vibration of the above-described member.

It is still another object of the present invention to provide a vibration transmission plate having a two-layer structure comprising an input layer which a vibration input pen contacts and a vibration propagating layer for propagating vibrations to sensors, in which one of the two layers has a pointed surface for being in point contact with the other layer at a contact portion between the two layers, and to limit the direction and the range of transmitted vibrations because the two layers are in point contact with one another.

It is still another object of the present invention to provide a vibration transmission plate having a multilayer structure comprising an input layer which a vibration input pen contacts, a vibration propagating layer for propagating vibrations to sensors, and an intermediate layer for transmitting vibration input from the input layer to the vibration propagating layer, in which the intermediate layer comprises a plurality of polygonal units which are arranged in a plane so as to provide cavities therebetween, and to control the direction and the range of transmitted vibrations by the cavities between the polygonal units.

It is still another object of the present invention to provide a vibration transmission plate having a two-layer structure comprising an input layer which a vibration input pen contacts, and a vibration propagating layer for propagating vibrations to sensors, and to provide the input layer with directivity in its direction of vibration transmission by using a member having a layer crystalline structure for the input layer.

It is still another object of the present invention to provide a vibration transmission plate having a multilayer structure comprising an input layer which a vibration input pen contacts, a vibration propagating layer for propagating vibration to sensors, and a solid lubricating layer for transmitting vibration between the input layer and the vibration propagating layer, and to prevent a phase change in the transmission of vibration by providing the solid lubricating layer.

These and other objects, aspects, features and advantages of the present invention will become apparent from the following detailed description of the preferred embodiments taken in conjuction with the accompanying drawings.

BRIEF DESCRIPTION OF THE DRAWINGS

FIG. 12 is a cross-sectional view illustrating a state ($\theta=90°$) of vibration transmission in the vibration transmission plate of the second embodiment;

FIG. 13 is a cross-sectional view illustrating a state ($\theta=60°$) of vibration transmission in the vibration transmission plate of the second embodiment;

DETAILED DESCRIPTION OF THE PREFERRED EMBODIMENTS

Preferred embodiments of the present invention will now be described in detail with reference to the drawings.

First Embodiment

Figure 3:
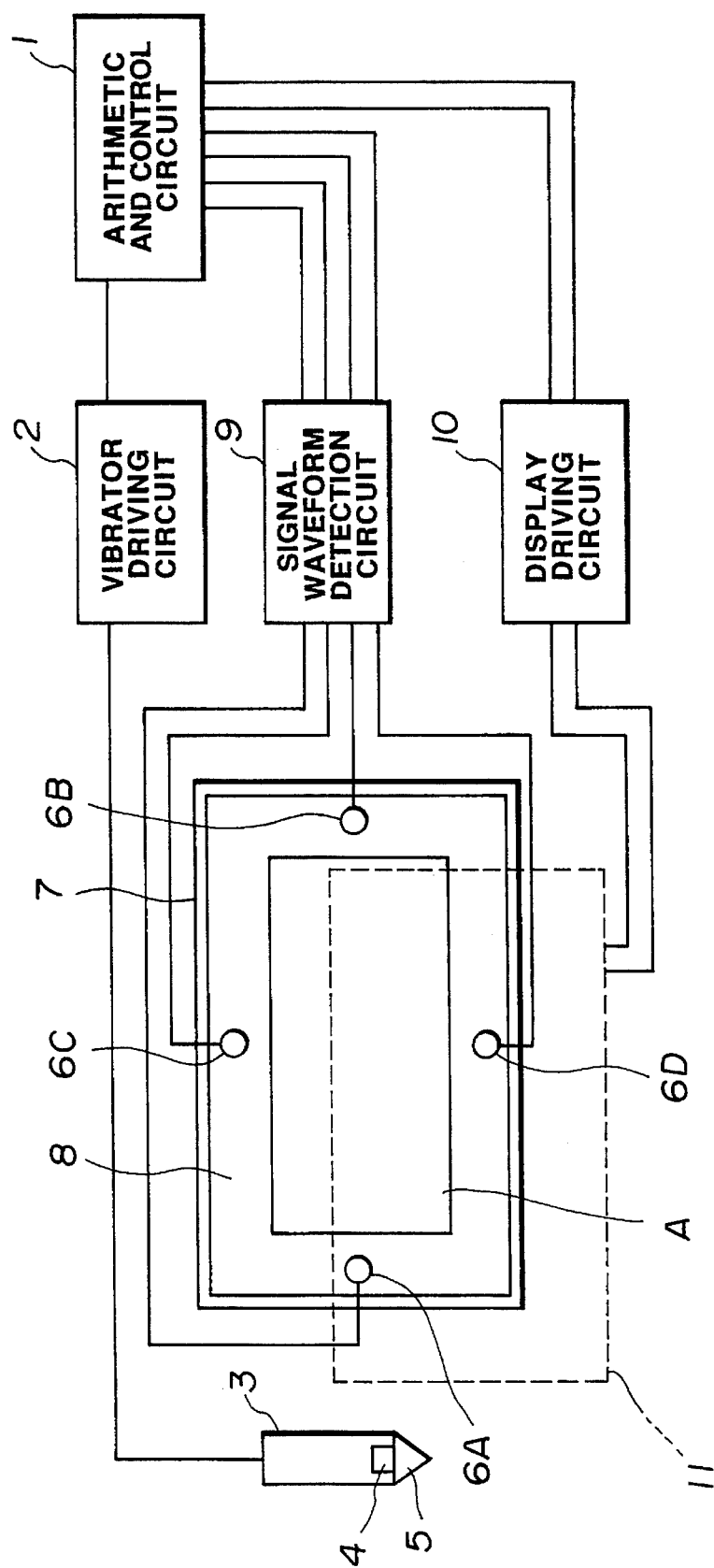
FIG. 3 is a diagram showing the configuration of circuitry of a coordinate input apparatus of the present invention.

FIG. 3 is a diagram showing the configuration of a coordinate input apparatus which uses a vibration transmission plate according to a first embodiment of the present invention. Each of the elements shown in block outline in FIG. 3 is well known per se, and a specific type of construction is not critical to carrying out the invention or to a disclosure of the best mode for carrying out the invention. In FIG. 3, arithmetic and control circuit 1 controls the entire apparatus, and calculates the position of coordinates. Vibrator driving circuit 2 vibrates a pen point of vibration input pen 3. Reference numeral 8 represents a vibration transmission plate of the present invention. Coordinates are input by touching the surface of vibration transmission plate 8 with vibration input pen 3. That is, by assigning a point within region A indicated by solid lines by vibration input pen 3, vibration generated by vibration input pen 3 is incident upon vibration transmission plate 8. The coordinates of the position of vibration input pen 3 can be calculated by measuring the incident vibration and processing the measured data.

In order to prevent propagated waves from being reflected at end surfaces of vibration transmission plate 8 and reflected waves from returning to a central portion, damping material 7 is provided at an outer circumference of vibration transmission plate 8. Vibration sensors 6A–6D, such as piezoelectric elements or the like, for converting mechanical vibration into electrical signals are fixed at inner portions near damping material 7. Signal waveform detection circuit 9 outputs signals representing vibration waves detected by sensors 6A–6D to arithmetic and control circuit 1. Reference numeral 11 represents a display, such as a liquid crystal display or the like, which can perform display in units of a dot. Display 11 is provided behind vibration transmission plate 8. Display 11 displays a dot at a position touched by vibration input pen 3 by the drive of display driving circuit 10. The displayed dot can be seen through vibration transmission plate 8.

Figure 4:
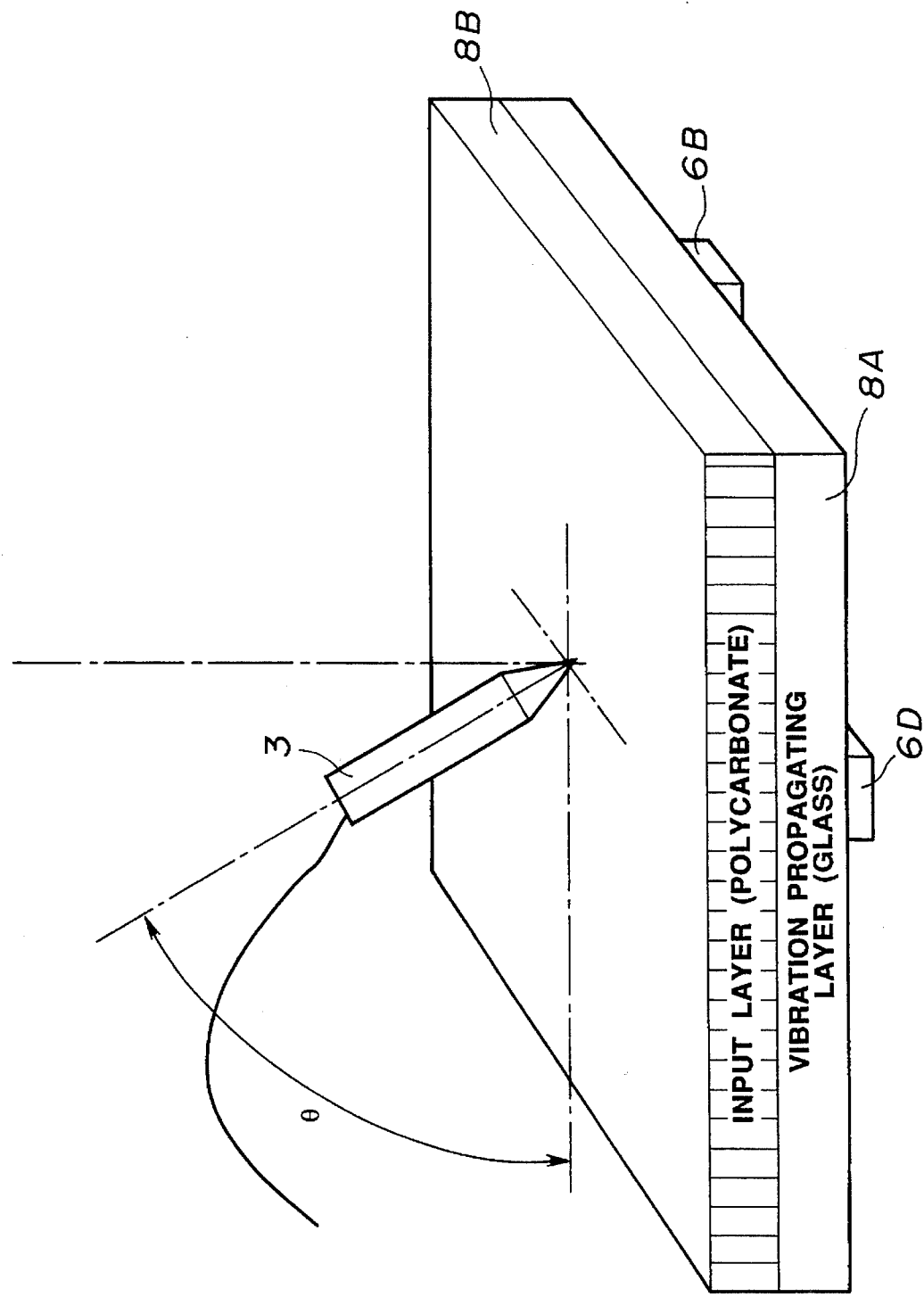
FIG. 4 is a perspective view showing the structure of a vibration transmission plate according to a first embodiment of the present invention.

Vibrator 4 incorporated within vibration input pen 3 is driven by vibrator driving circuit 2. The driving signal for vibrator 4 is supplied from arithmetic and control circuit 1 in the form of a pulse signal to vibrator 4 after being amplified with a predetermined gain by vibrator driving circuit 2. The electrical driving signal is converted into mechanical vibration by vibrator 4, and the converted vibration is transmitted to vibration transmission plate 8 via pen point 5. FIG. 4 is a diagram showing the structure of the vibration transmission plate 8 of the present embodiment.

In FIG. 4, vibration transmission plate 8 comprises two layers, i.e., input layer 8B and vibration propagating layer 8A. In order that the component of vibration in the longitudinal direction of the plate in the input layer is hardly transmitted to the vibration propagating layer, the respective layers are not bonded. This is for increasing the effect of preventing the influence of inclination of the vibration input pen from being transmitted within the vibration propagating layer. The mechanical vibration generated by vibrator 4 is input to input layer 8B by vibration input pen 3. The vibration wave is propagated to vibration propagating layer 8A via input layer 8B, and is detected by sensors 6A–6D mounted at vibration propagating layer 8A. Contact angle θ made by vibration input pen 3 and vibration transmission plate 8 is an artificially assumed contact angle expected in the use of the coordinate input apparatus, and has a range of 60°–90°. That is, even if vibration input pen 3 is inclined the maximum angle of 30° from an axis perpendicular to the surface of vibration transmission plate 8, it is possible to remove the influence of the inclination when vibration waves received by sensors 6A–6D reach arithmetic and control circuit 1 via signal waveform detection circuit 9.

In a particular configuration of the vibration transmission plate in the present embodiment, a polycarbonate sheet having a flexural modulus of elasticity of 300 kgf/mm$^2$ is used as the input layer, and a glass plate is used as the vibration propagating layer. Table 1 shows the properties of these materials.

TABLE 1

| | Glass (Vibration propagating layer) | Polycarbonate (Input layer) |
|---|---|---|
| Density (g/cm$^3$) | 2.5 | 1.2 |
| Flexural modulus of elasticity | 7000 | 300 |
| Poisson's ratio | 0.27 | 0.36 |

Figure 1:
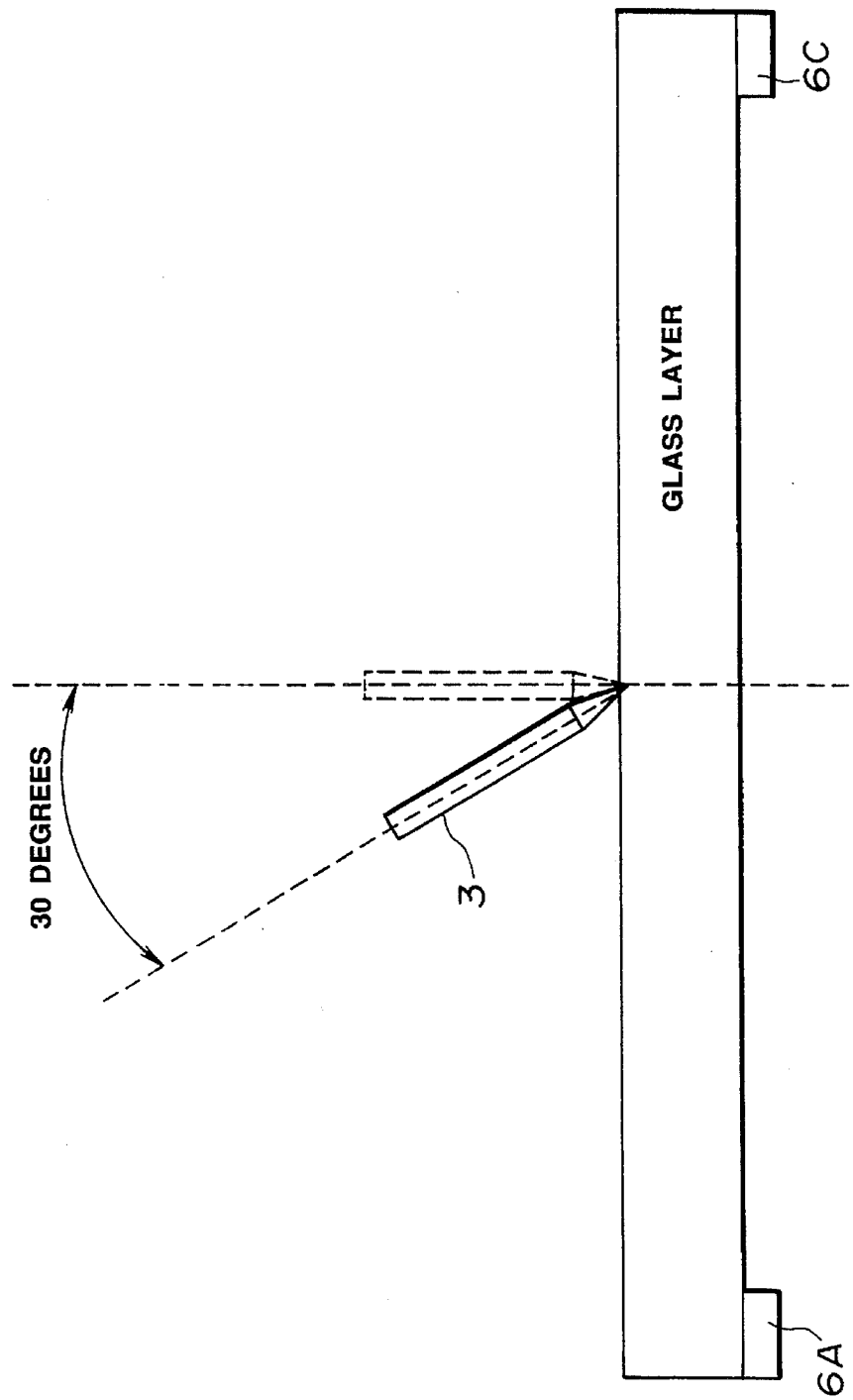
FIG. 1 is a diagram showing the structure of a model of a conventional vibration transmission plate.
Figure 2:
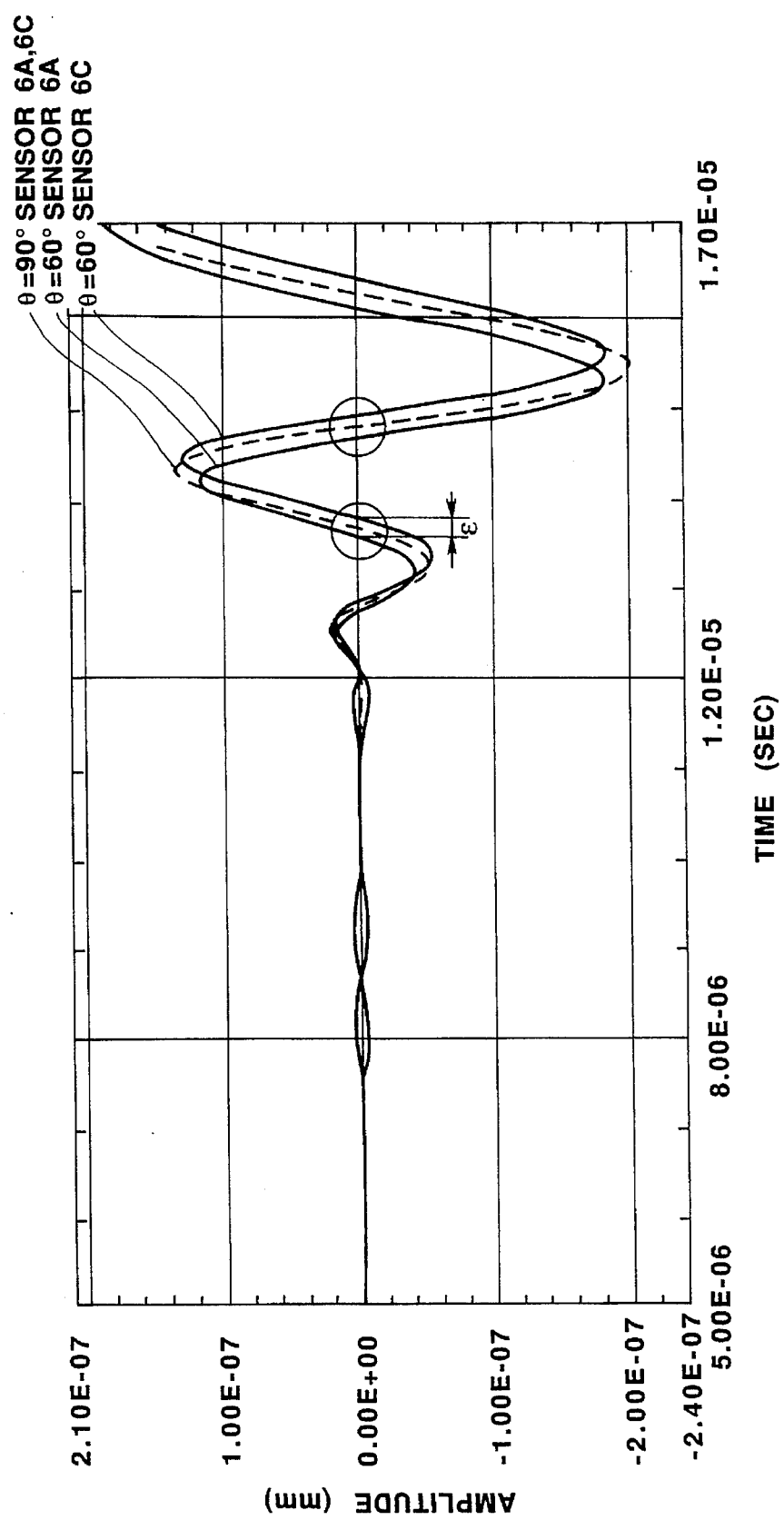
FIG. 2 is a diagram illustrating the behavior of vibration waves transmitted through a conventional vibration transmission plate.
Figure 5:
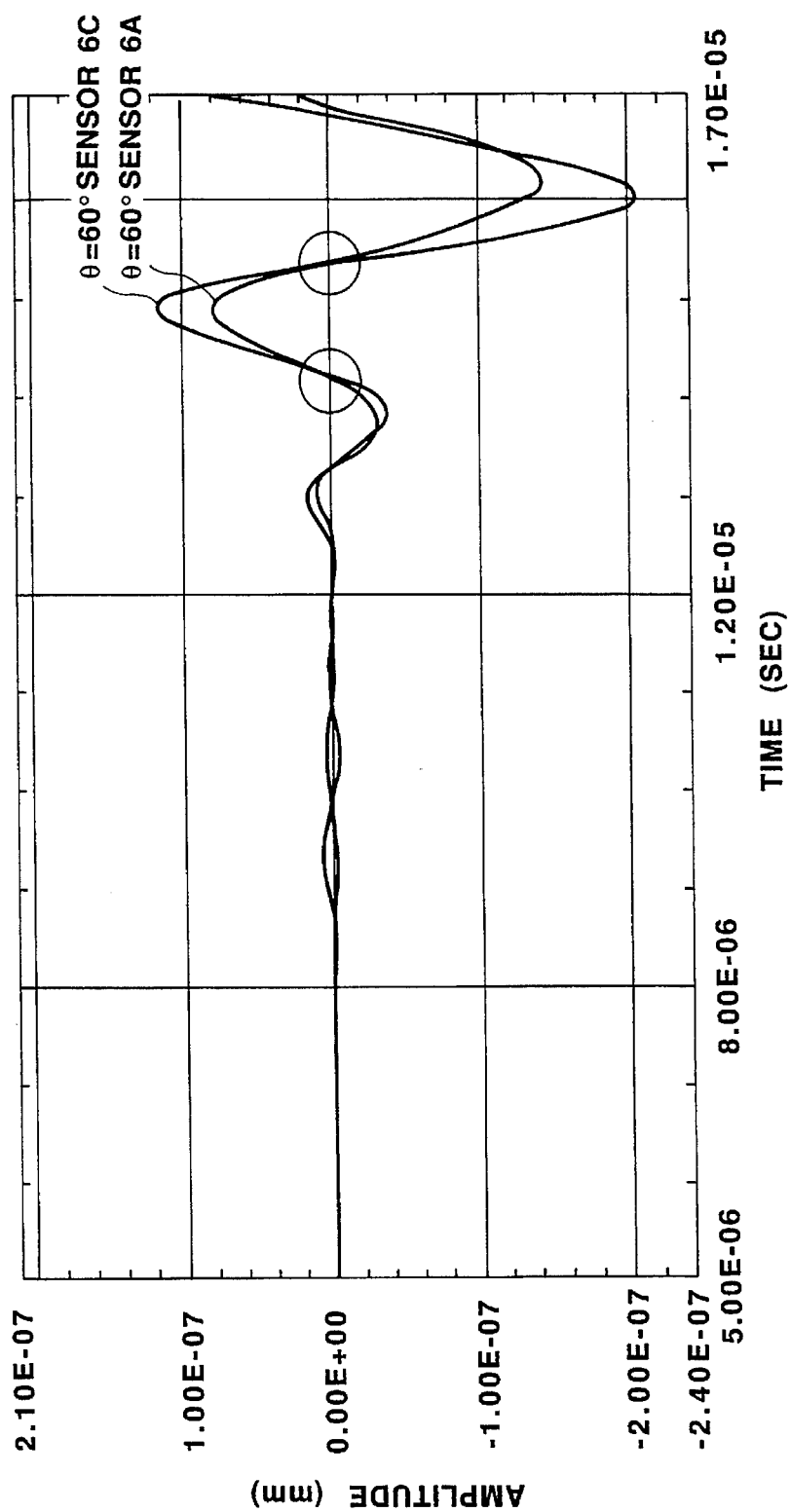
FIG. 5 is a diagram illustrating the behavior of vibration waves transmitted through the vibration transmission plate of the first embodiment.

For the purpose of comparison with the model of the conventional approach shown in FIG. 2, vibration waves received by sensors 6A and 6C when the vibrating input pen contacts the vibration transmission plate with an angle θ=60° are shown in FIG. 5. In FIG. 5, the values of the phase delay ε indicated within circles have values substantially equal to "0". Hence, it can be understood that this vibration transmission plate is effective in reducing the detection error of the position in the coordinate input apparatus which utilizes transmission of ultrasonic waves.

Figure 6:
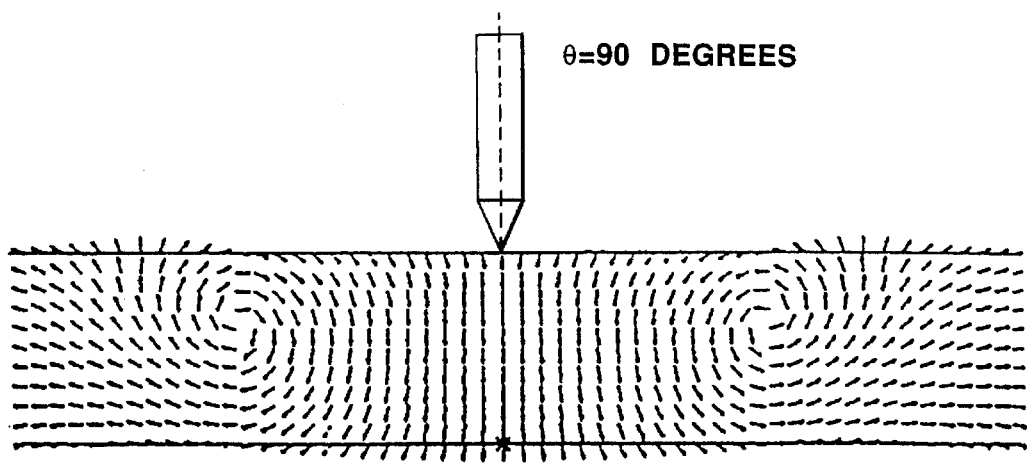
FIG. 6 is a cross-sectional view illustrating a state ($\theta=90°$) of vibration transmission in a conventional vibration transmission plate.
Figure 7:
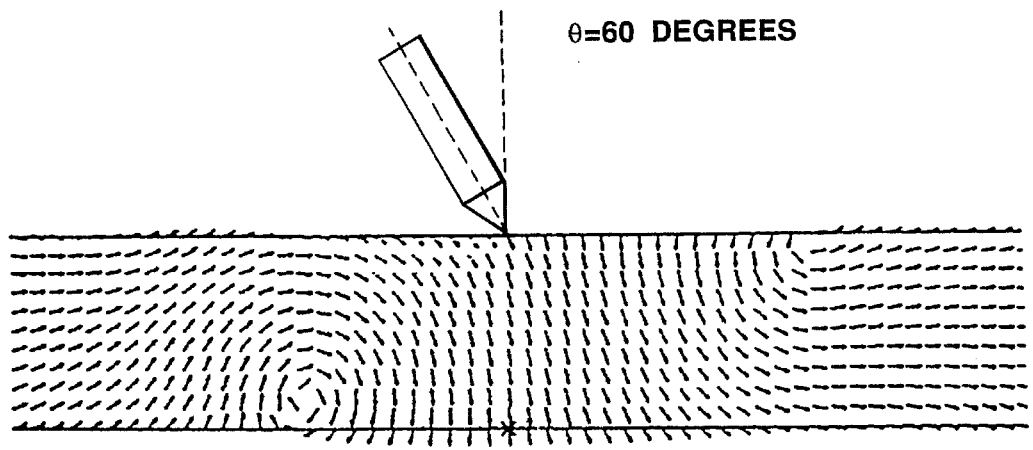
FIG. 7 is a cross-sectional view illustrating a state ($\theta=60°$) of vibration transmission in the conventional vibration transmission plate.
Figure 8:
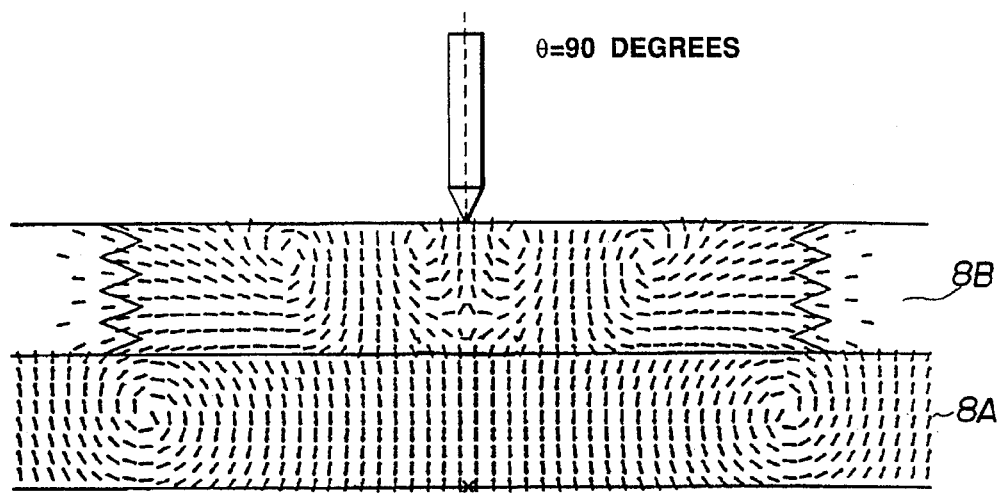
FIG. 8 is a cross-sectional view illustrating a state ($\theta=90°$) of vibration transmission in the vibration transmission plate of the first embodiment.
Figure 9:
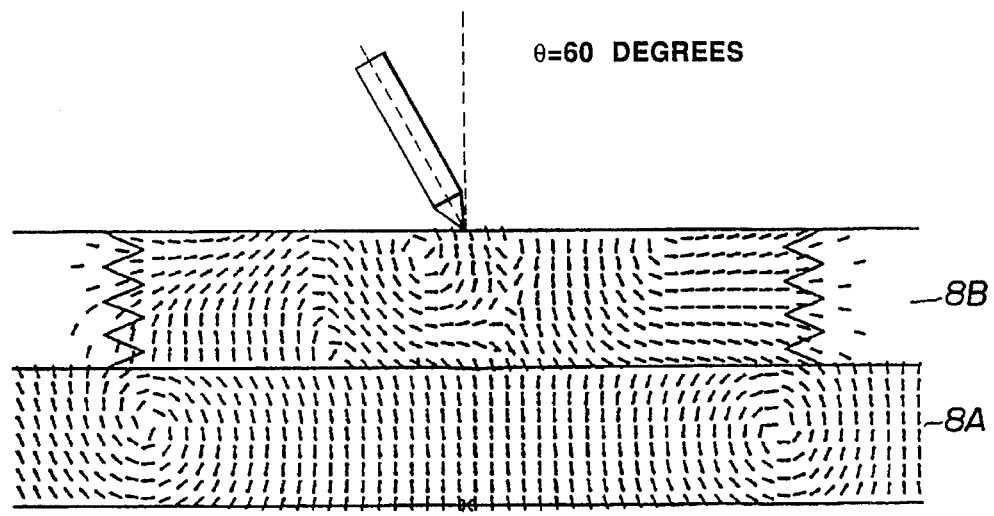
FIG. 9 is a cross-sectional view illustrating a state ($\theta=60°$) of vibration transmission in the vibration transmission plate of the first embodiment.

In order to clearly explain the effect of reducing the phase delay in the vibration transmission plate of the present embodiment, each of FIGS. 6 and 7 illustrates the behavior of vibration in the conventional approach in which the vibration transmission plate comprises a single glass plate. Each arrow shown in FIGS. 6 and 7 represents a displacement vector at each material point in the vibration transmission plate. Each of FIGS. 8 and 9 illustrates the behavior of vibration when the vibration transmission plate shown in FIG. 4 is used.

In the case of the single glass plate shown in FIG. 7 (the conventional approach), in which the vibrating input pen contacts the vibration transmission plate with an angle θ=60°, the behavior of vibration within the vibration transmission plate has asymmetry, and therefore the arrival time of a wave detected by a sensor changes. On the other hand, in the case of the vibration transmission plate of the present embodiment shown in FIG. 9, in which the vibration input pen contacts the vibration transmission plate with an angle θ=60°, while the behavior of vibration has asymmetry in the horizontal direction caused by the inclination of the vibrating input pen in the input layer, the behavior of vibration is substantially symmetric in the vibration propagating layer. That is, a decrease in asymmetry in the behavior of vibration in the input layer causes a reduction of the value of the phase delay ε. As a result, accuracy in the calculated coordinate value is improved.

Figure 10:
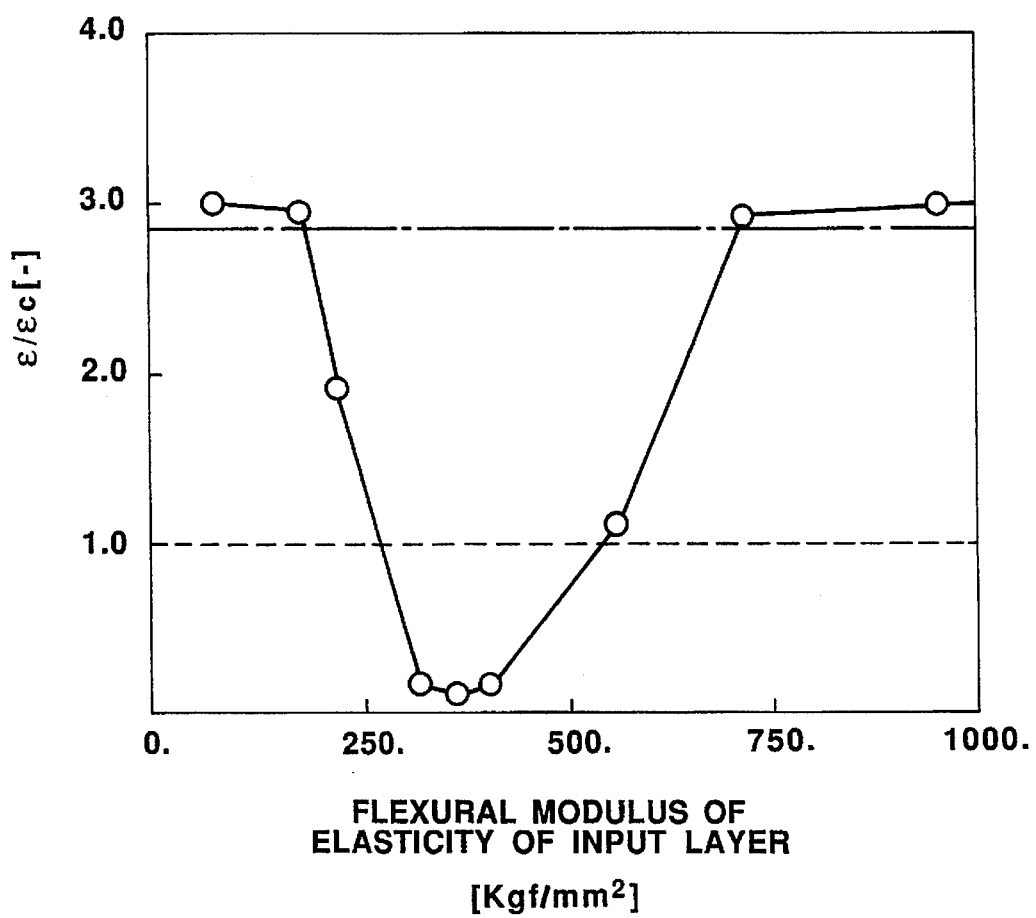
FIG. 10 is a diagram showing the effect of the flexural modulus of elasticity of an input layer of the vibration transmission plate of the first embodiment.

In order to show how the phase delay ε changes according to the material of the input layer of the vibration transmission plate in the present embodiment, the influence of the flexural modulus of elasticity of the input layer on the phase delay is illustrated in FIG. 10. In FIG. 10, the abscissa represents the flexural modulus of elasticity of the input layer. The ordinate represents the value of the phase delay ε normalized by being divided by the value of the phase delay $\epsilon_c$ which can achieve an accuracy (resolution) of 0.1 mm in the coordinate input apparatus.

It can be understood from FIG. 10 that the effect of the flexural modulus of elasticity of the input layer for the phase delay greatly changes near the threshold ($\epsilon/\epsilon_c=2.7$) indicated by a chain line. That is, FIG. 10 shows the range of the flexural modulus of elasticity of the input layer which is effective for removing the influence of inclination of the vibration input pen in the coordinate input apparatus when the inclination of the vibration input pen is less than 30°, i.e., the range between 180.0–720.0 kgf/mm². It is possible to restrict the material for the input layer in accordance with the target accuracy of the coordinate input apparatus using FIG. 10. For example, for the value $\epsilon/\epsilon_o$ of less than 1.0 which corresponds to the resolution of the coordinate input apparatus of less than 0.1 mm, the range of the flexural modulus of elasticity of the input layer is 270.0–543.0 kgf/mm².

The following plastics can be used as the material for the input layer in addition to polycarbonate which has been described above:

Polyethylene

Polypropylene

Polyether ketone

Polybutylene terephthalate

Polysulfone

Second Embodiment

Figure 11:
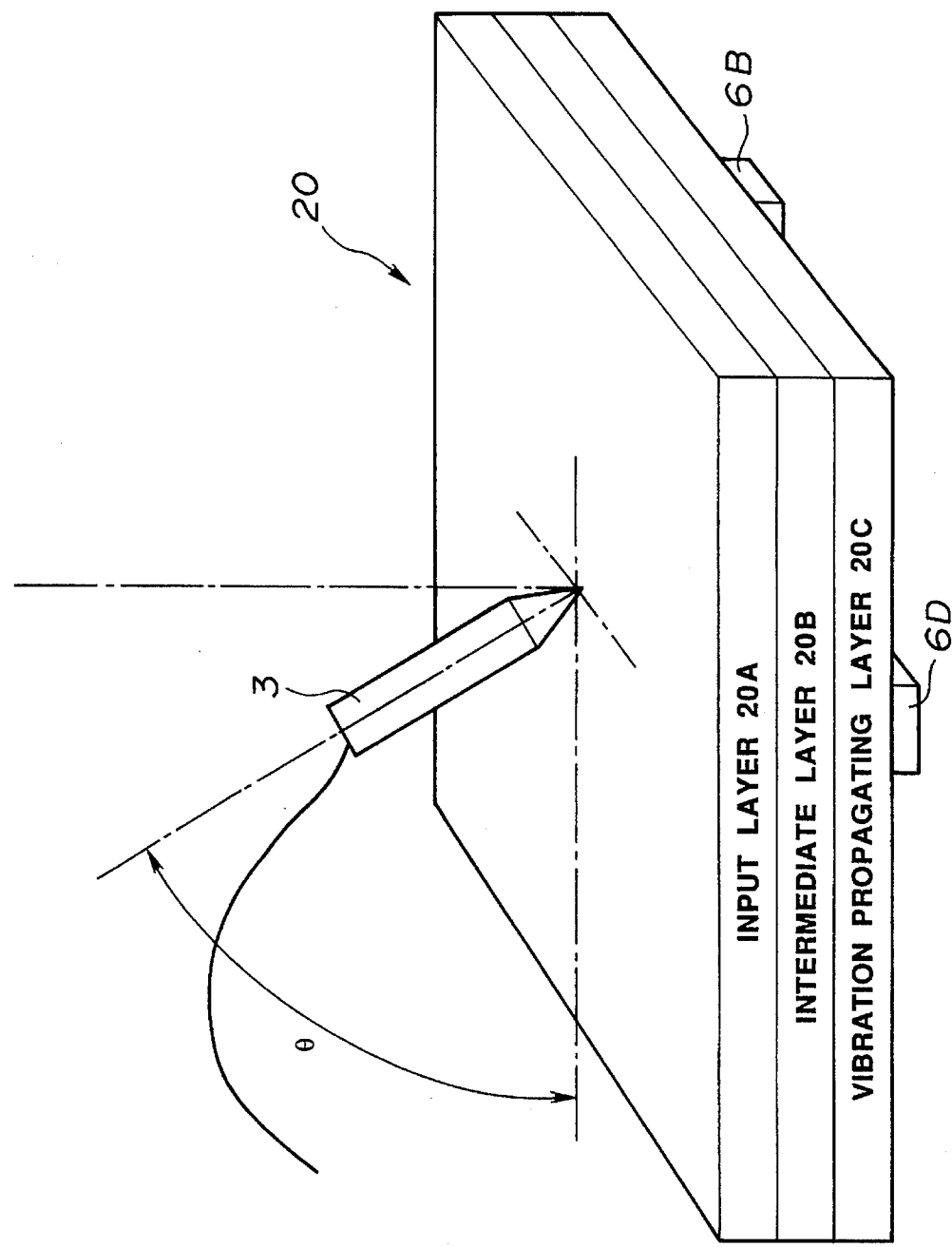
FIG. 11 is a perspective view showing the structure of a vibration transmission plate according to a second embodiment of the present invention.

FIG. 11 shows the structure of a vibration transmission plate according to a second embodiment of the present invention.

In the present embodiment, the vibration transmission plate is configured by superposing three layers of glass plates, each of which has a thickness of 0.77 mm. The respective layers are termed input layer 20A, intermediate layer 20B, and vibration propagating layer 20C in the sequence from above. Sensors 6A–6D are mounted on vibration propagating layer 20C. In order that the component of vibration in the longitudinal direction of the plate is hardly transmitted between the respective layers, the respective layers contact each other without being bonded together. This is for increasing the effect of preventing the influence of the vibration input pen from being exerted within the vibration propagating layer. Mechanical vibration generated by vibrator 4 is input to input layer 20A by vibration input pen 3, and vibration waves are propagated to intermediate termediate layer 20B and vibration propagating layer 20C via input layer 20A, and are detected by sensors 6A–6D mounted at vibration propagating layer 20C. Contact angle 0 made by vibrating input pen 3 and vibration transmission plate 20 indicated in FIG. 11 is an artificially assumed contact angle expected in the use of the coordinate input apparatus, and has a range of 60°–90°. That is, even if vibration input pen 3 is inclined the maximum angle of 30° from a state perpendicular to vibration transmission plate 20, it is possible to remove the influence of the inclination when signals representing vibration waves received by sensors 6A–6D reach arithmetic and control circuit 1 via signal waveform detection circuit 9.

Table 2 shows the properties of a particular material of glass used in the present embodiment.

TABLE 2

| | |
|---|---|
| Density (g/cm³) | 2.5 |
| Flexural modulus of elasticity (kg/mm²) | 7000 |
| Poisson's ratio | 0.27 |

Each of FIGS. 12 and 13 illustrates the behavior of vibration in the cross section of the vibration transmission plate when vibration is input to the vibration transmission plate by the vibration input pen.

FIG. 12 corresponds to the case of the angle of inclination of the vibration input pen θ=90°, and FIG. 13 corresponds to the case of the angle of inclination of the vibration input pen θ=60°.

When the vibration input pen contacts the vibration transmission plate with θ=90°, the behavior of vibration within the vibration transmission plate is symmetric in the horizontal direction.

It can be understood that when the vibration input pen contacts the vibration transmission plate with θ=60°, while the behavior of vibration is asymmetric in the horizontal direction caused by the inclination of the vibration input pen, the behavior of vibration is substantially symmetric in the vibration propagating layer, and substantially identical in the case of contact with θ=90°.

This decrease in asymmetry in the behavior of vibration in the input layer causes a reduction of the value of the phase delay $\epsilon$. As a result, accuracy in the calculated coordinate value is improved.

Third Embodiment

Figure 14:
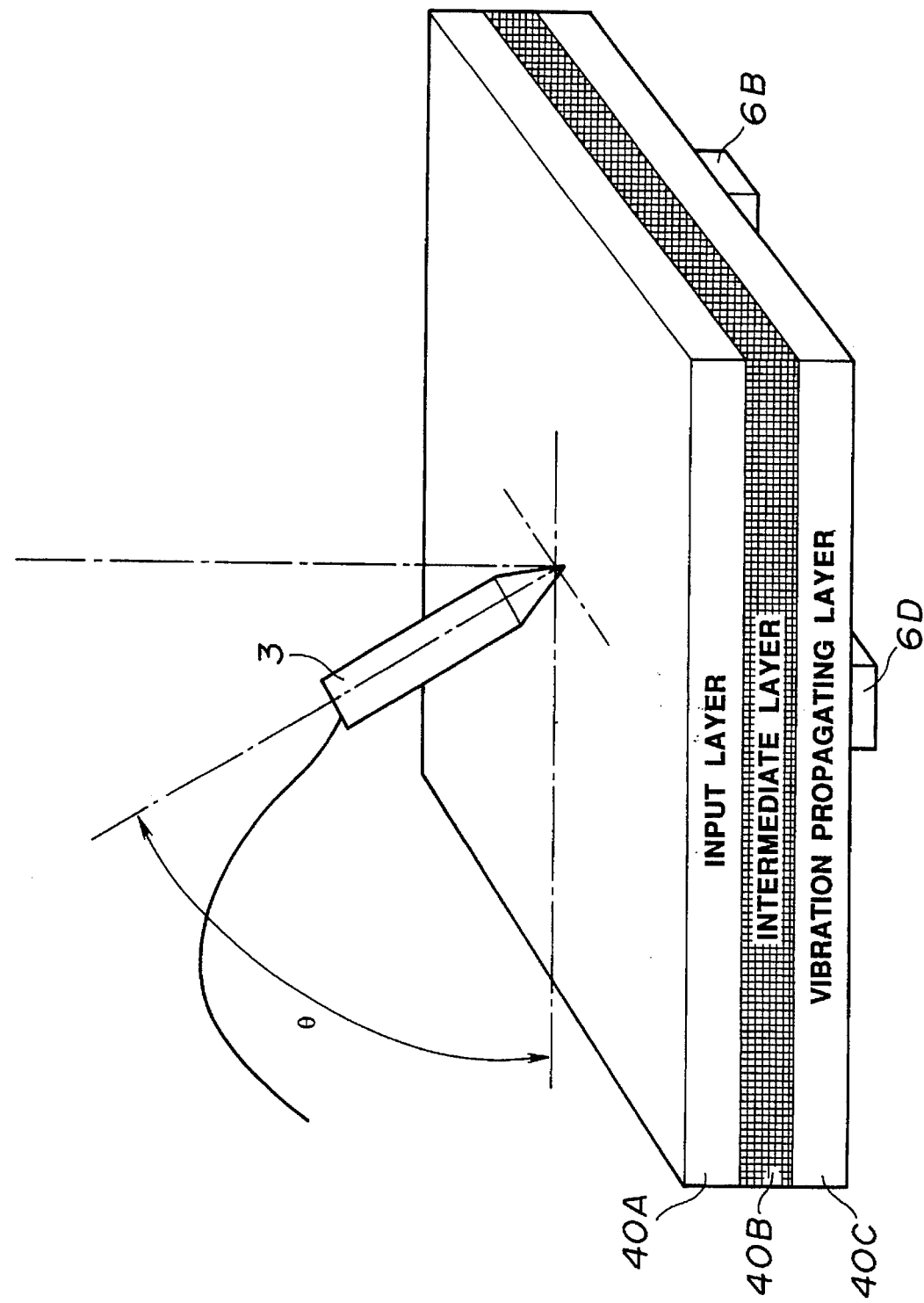
FIG. 14 is a cross-sectional view showing the structure of a vibration transmission plate according to a third embodiment of the present invention.

FIG. 14 shows the structure of a vibration transmission plate according to a third embodiment of the present invention. In FIG. 14, the vibration transmission plate is configured by three layers, i.e., input layer 40A, intermediate layer 40B, and vibration propagating layer 40C. In the present embodiment, a layer 0.5 mm thick made of monofilament glass fibers is used as intermediate layer 40B, and input layer 40A is obtained by coating a polycarbonate film 0.3 mm thick at the input surface side for vibration input pen 3. The polycarbonate film is used for preventing deterioration of an input operation by vibration input pen 3 in the actual use, since glass fibers are used for intermediate layer 40B. A glass plate 1.0 mm thick is used as vibration propagating layer 40C. Vibration input to input layer 40A by vibration input pen 3 is propagated to vibration propagating layer 40C via intermediate layer 40B. Vibration waves are detected by sensors 6A–6D mounted on vibration propagating layer 40C.

Figure 15:
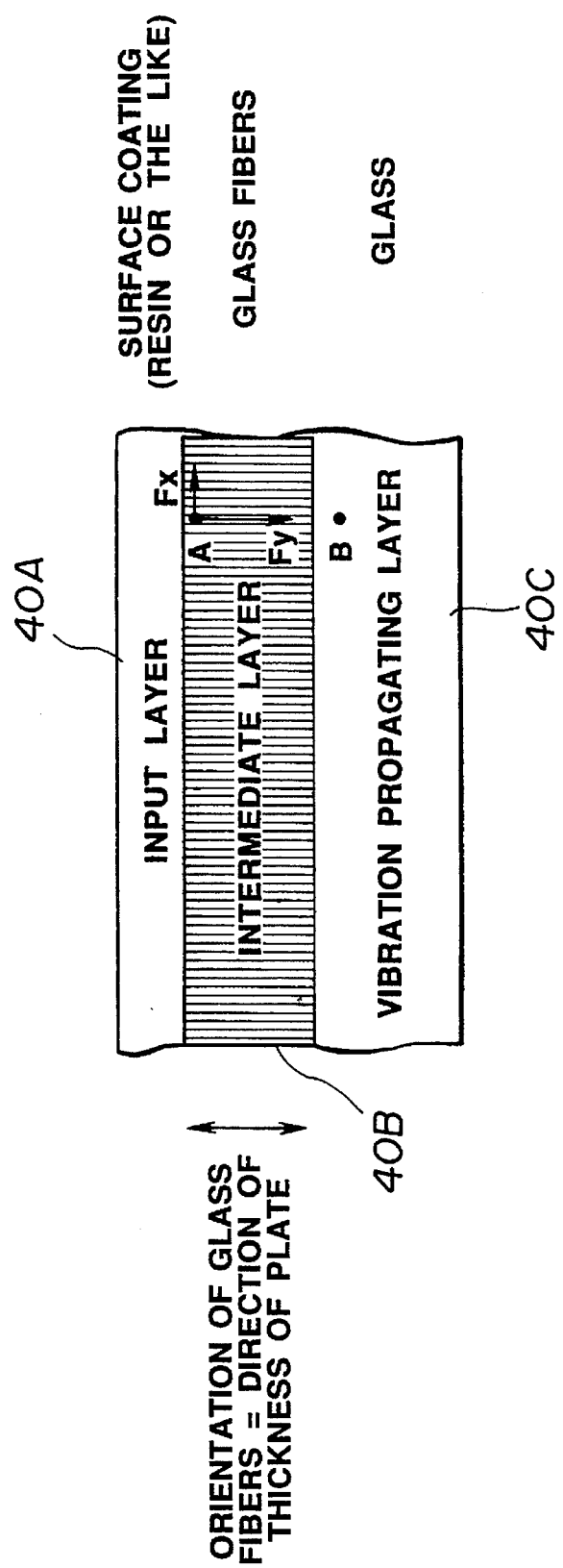
FIG. 15 is a cross-sectional view showing the structure of the cross section of the vibration transmission plate of the third embodiment.

FIG. 15 is a diagram schematically illustrating the structure of the cross section of the vibration transmission plate. When the vibration by vibration input pen 3 is incident with an angle θ with respect to a normal direction to the surface of the vibration transmission plate, a force applied to material particle A within intermediate layer 40B has component Fx in the x direction and component Fy in the y direction as shown in FIG. 15. If component Fx is directly transmitted to material points within the vibration propagating layer as in the conventional approach, the behavior of vibration in the vibration propagating layer is asymmetric in the horizontal direction, whereby a phase delay $\epsilon$ is produced due to the inclination of the vibration input pen. However, by making the orientation of glass fibers to be parallel to the direction of the thickness of the plate as indicated in FIG. 15, component Fx is propagated much less in the direction of the thickness of the plate than component Fy. As a result, the value of component Fx at material particle B within vibration propagating layer 40C is reduced, whereby asymmetry in the horizontal direction in the behavior of vibration in vibration propagating layer 40C decreases, and a decrease in accuracy of the detected position caused by the inclination of the vibration input pen is reduced. Although glass fibers are used for the intermediate layer of the present embodiment, acrylic-resin-type plastic fibers may also be used as a material for intermediate layer 40B.

Fourth Embodiment

Figure 16:
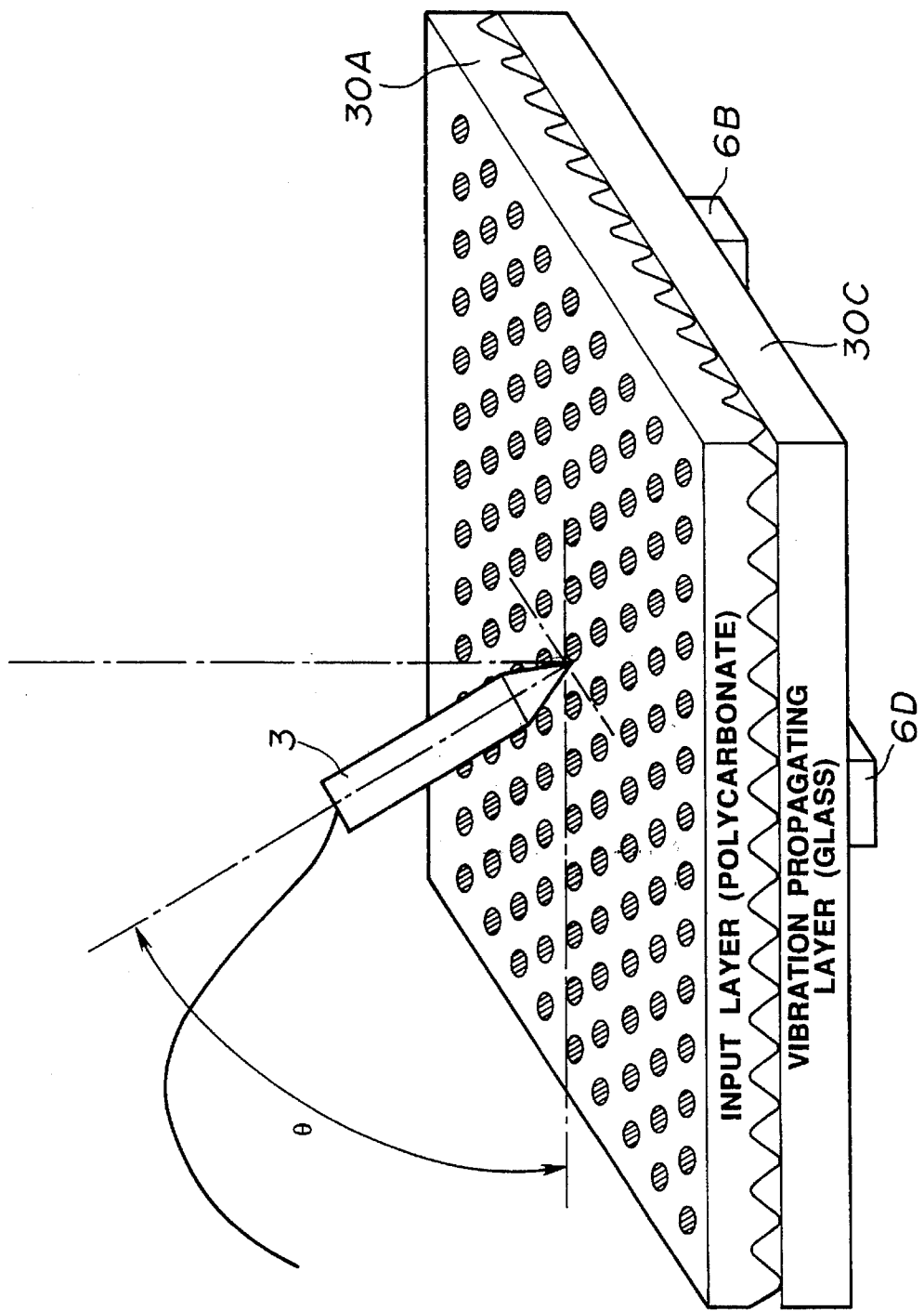
FIG. 16 is a perspective view showing the structure of a vibration transmission plate according to a fourth embodiment of the present invention.

FIG. 16 shows the structure of a vibration transmission plate according to a fourth embodiment of the present invention. In FIG. 16, the vibration transmission plate is configured by two layers, i.e., input layer 30A and vibration propagating layer 30C. In order that the component of vibration in the longitudinal direction of the plate in input layer 30A is hardly transmitted to vibration propagating layer 30C, the vibration transmission plate is configured so that projections of input layer 30A contact vibration propagating layer 30C while the respective layers are not bonded together. This is for increasing the effect of preventing the influence of inclination of vibration input pen 3 from being exerted within vibration propagating layer 30C. Semitransparent marks are coated at positions corresponding to the projections of input layer 30A (see FIG. 17) on the vibration input surface of input layer 30A. Vibration input by vibration input pen 3 near the position of a mark (the coordinate input position) on the vibration input surface is propagated to vibration propagating layer 30C via input layer 30A. Vibration waves are detected by sensors 6A–6D mounted on vibration propagating layer 30C. Angle θ made by vibration input pen 3 and the vibration transmission plate represents an artificially assumed contact angle in the use of the coordinate input apparatus. In the present embodiment, each of the coated marks has the shape of a circle having a diameter of 0.5 mm. Both input layer 30A and vibration propagating layer 30C are 1.5 mm thick, and the pitch of projections and recesses of input layer 30A is 1.0 mm. Polycarbonate is used for input layer 30A, and glass is used for vibration propagating layer 30C.

Figure 17:
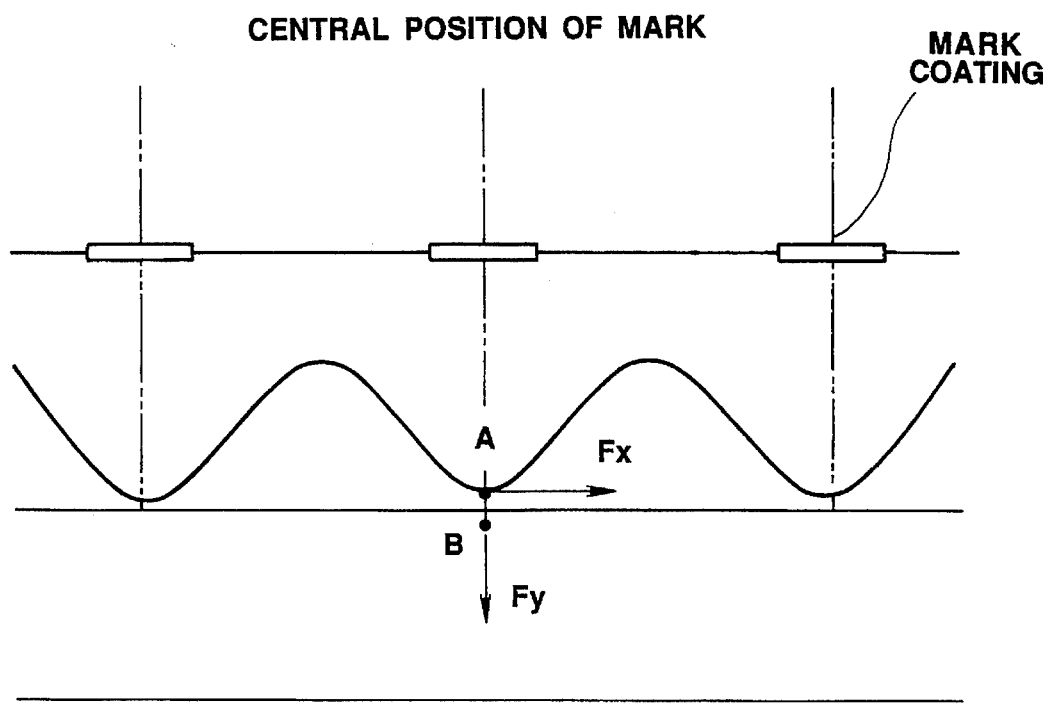
FIG. 17 is a cross-sectional view showing the structure of the cross section of the vibration transmission plate of the fourth embodiment.

FIG. 17 is a cross-sectional view of the vibration transmission plate. When vibration input by vibration input pen 3 is incident with an angle θ with respect to a normal direction to the surface of the vibration transmission plate, a force applied to material particle A present at the apex of a projection of input layer 30A has component Fx in the x direction and component $F_y$ in the y direction as shown in FIG. 17. If the contact surface between the input layer and the vibration propagating layer is flat as in the conventional approach, and component $F_x$ is directly transmitted to material particles within the vibration propagating layer, the behavior of vibration in the vibration propagating layer is asymmetic in the horizontal direction, and a phase delay ε is produced due to inclination of the vibration input pen. In the present embodiment, however, input layer 30A is in point contact with vibration propagating layer 30B due to projections and recesses provided in input layer 30A. Hence, slip is produced between material particles A and B, and only component $F_y$ applied to material particle A is transmitted to material point B. That is, vibration input in the vicinity of the center of the mark is transmitted to material particle B situated below the center of the mark as vibration not having the x-direction component. Hence, the behavior of vibration is symmetric in the horizontal direction within vibration propagating layer 30C, and a decrease in accuracy of the detected position due to inclination of vibration input pen 3 can be prevented.

Alternatively, if, for example, a fluid whose refractive index is close to the refractive index of the material of input layer 30A is filled in a space between input layer 30A and vibration propagating layer 30C, accuracy in the detected position is improved.

Fifth Embodiment

Figure 18:
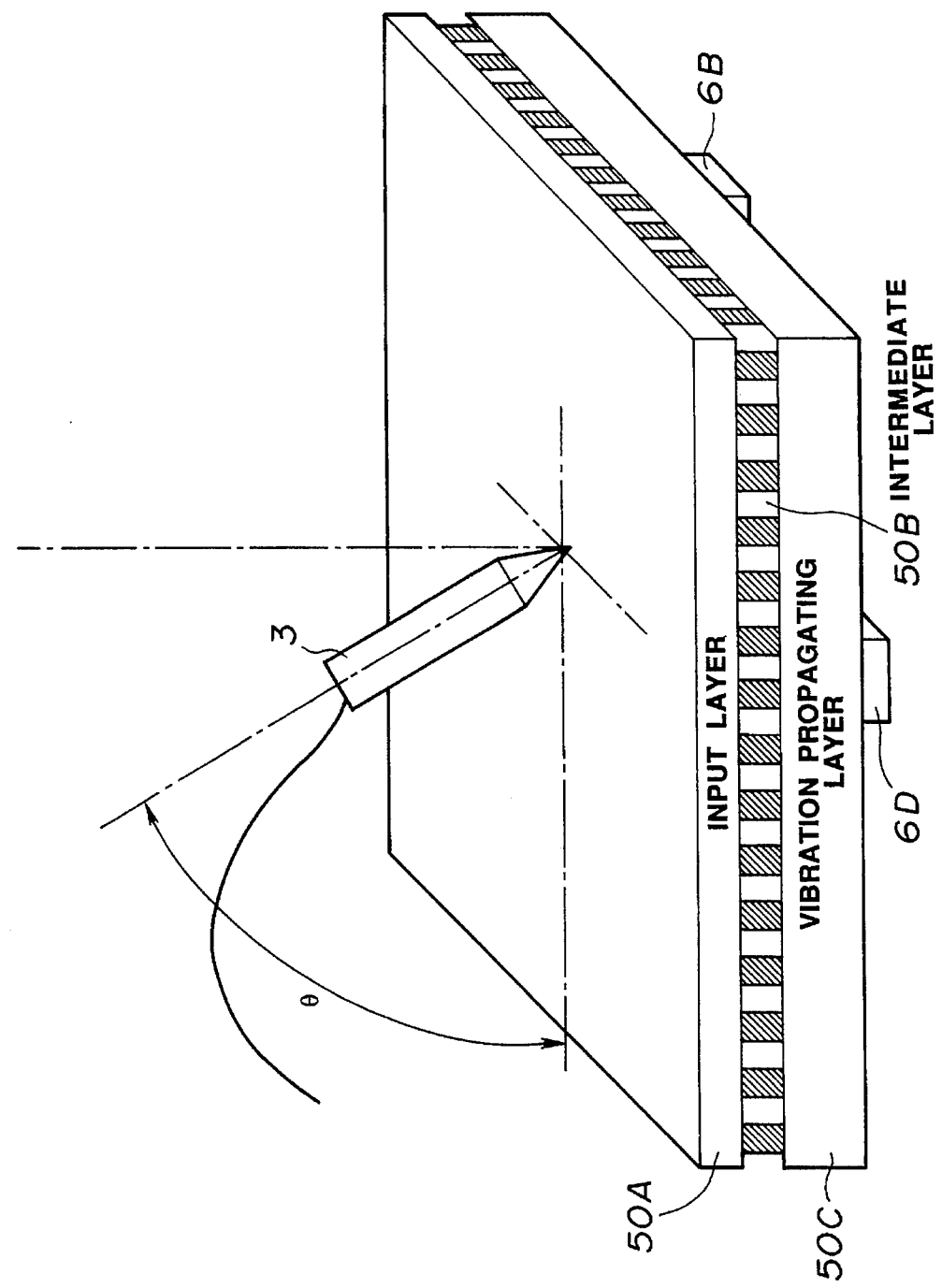
FIG. 18 is a perspective view showing the structure of a vibration transmission plate according to a fifth embodiment of the present invention.

FIG. 18 shows the structure of a vibration transmission plate according to a fifth embodiment of the present invention. In FIG. 18, the vibration transmission plate is configured by three layers, i.e., input layer 50A, intermediate layer 50B, and vibration propagating layer 50C. In the present embodiment, a polycarbonate plate 0.5 mm thick is used as input layer 50A, and a glass plate 1.0 mm thick is used as vibration propagating layer 50C. Intermediate layer 50B comprises polycarbonate cubic units having an edge of 0.5 mm arranged with an equal interval of 0.5 mm. The upper surfaces and the lower surfaces of the cubic units are bonded to input layer 50A and vibration propagating layer 50C, respectively. Vibration input to input layer 50A by vibration input pen 3 is propagated to vibration propagating layer 50C via intermediate layer 50B. Vibration waves are detected by sensors 6A–6D mounted at vibration propagating layer 50C.

Figure 19:
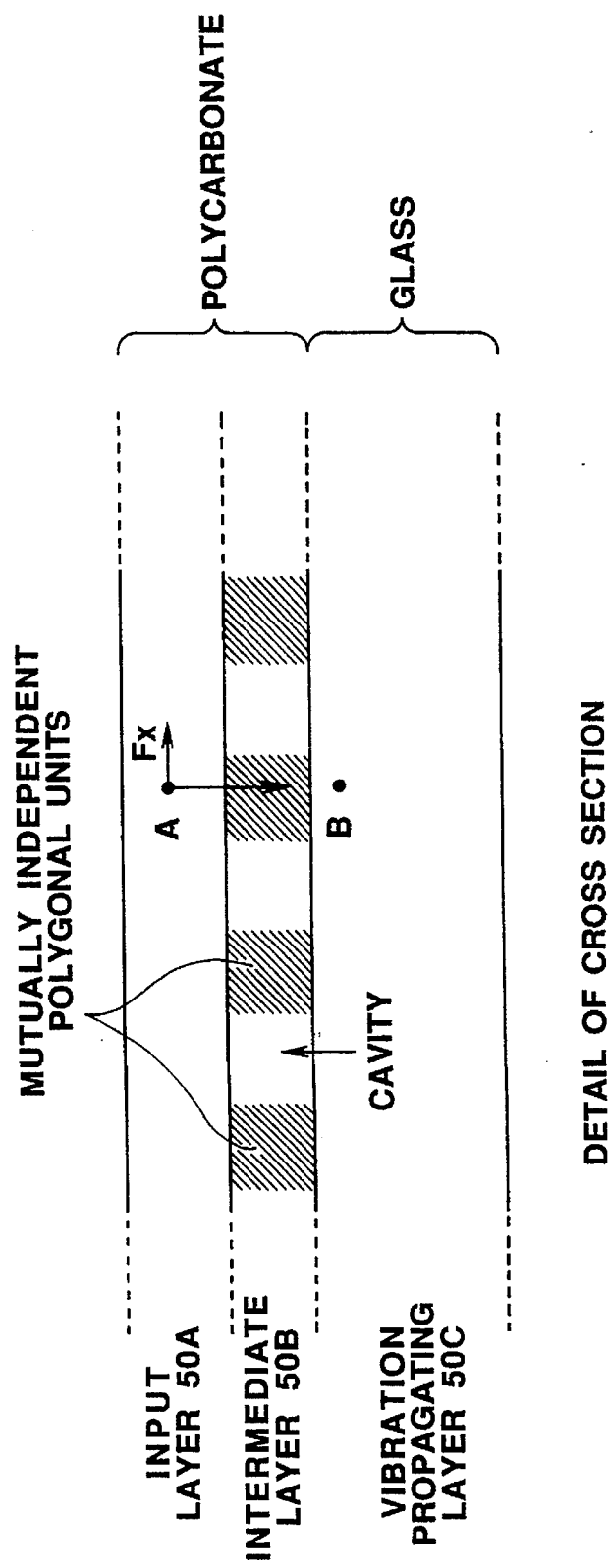
FIG. 19 is a cross-sectional view showing the structure of the cross-section of the vibration transmission plate of the fifth embodiment.

FIG. 19 is a diagram showing the structure of the cross-section of the vibration transmission plate of the fifth embodiment. When vibration input by vibration input pen 3 is incident with an angle θ with respect to a normal direction to the surface of the vibration transmission plate, a force applied to material particle A present at the apex of a projection of input layer 30A has component $F_x$ in the x direction and component $F_y$ in the y direction, as shown in FIG. 19. If component $F_x$ is directly transmitted to material particle B within the vibration propagating layer, the behavior of vibration in the vibration transmission plate is asymmetric in the horizontal direction, and a phase delay ε is produced by inclination of the vibration input pen. However, by providing the intermediate layer comprising the cubic units which are independent in the y direction with a certain interval therebetween as shown in FIG. 18, transmission of component $F_y$ applied to material particle A to material particle B decreases.

As a result, the value of component $F_x$ at material particle B within the vibration propagating layer is reduced, and the asymmetry in the horizonal direction in the behavior of vibration within the vibration transmission layer is reduced, whereby a decrease in accuracy of the detected position due to inclination of the vibration input pen can be prevented.

Alternatively, rectangular parallelepiped units, triangular prisms, tetrahedrons or the like may also be used as polygonal units used for the intermediate layer in addition to cubic units.

Sixth Embodiment

Figure 20:
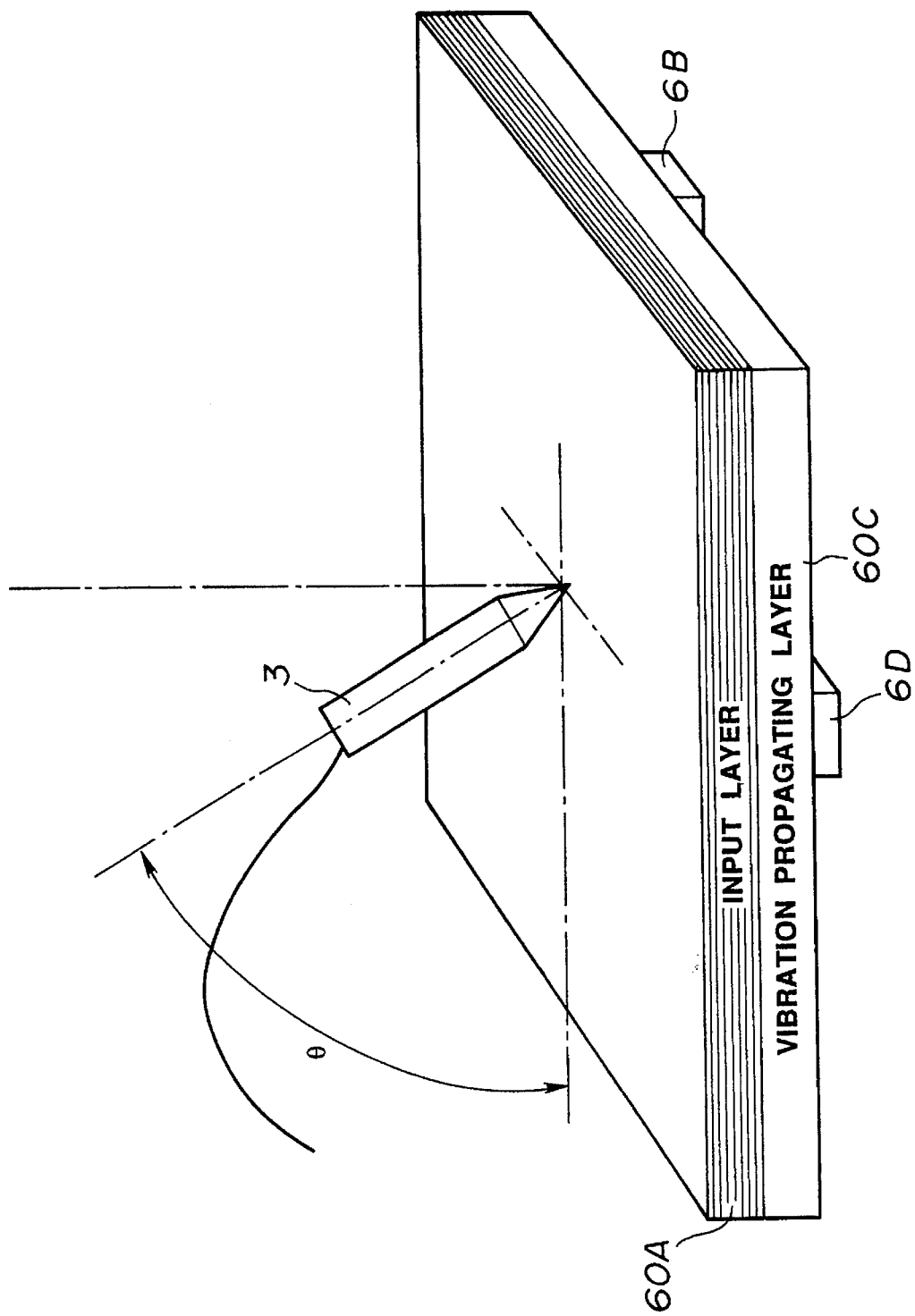
FIG. 20 is a perspective view showing the structure of a vibration transmission plate according to a sixth embodiment of the present invention.

FIG. 20 is a digram showing the structure of a vibration transmission plate according to a sixth embodiment of the present invention. In FIG. 20, the vibration transmission plate is configured by two layers, i.e., input layer 60A and vibration propagating layer 60C. Input layer 60A and vibration propagating layer 60C are bonded together. Vibration input by vibration input pen 3 is propagated to vibration propagating layer 60C via input layer 60A. Vibration waves are detected by sensors 6A–6D mounted on vibration propagating layer 60C. Angle θ made by vibration input pen 3 and vibration transmission plate 8 shown in FIG. 20 represents an artificially assumed contact angle expected in the use of the coordinate input apparatus. In the present embodiment, input layer 60A is 0.8 mm thick, and vibration propagating layer 60C is 1.5 mm thick. Graphite consisting of hexagonal-system layer crystals, and glass are used for input layer 60A and 60C, respectively.

Figure 21:
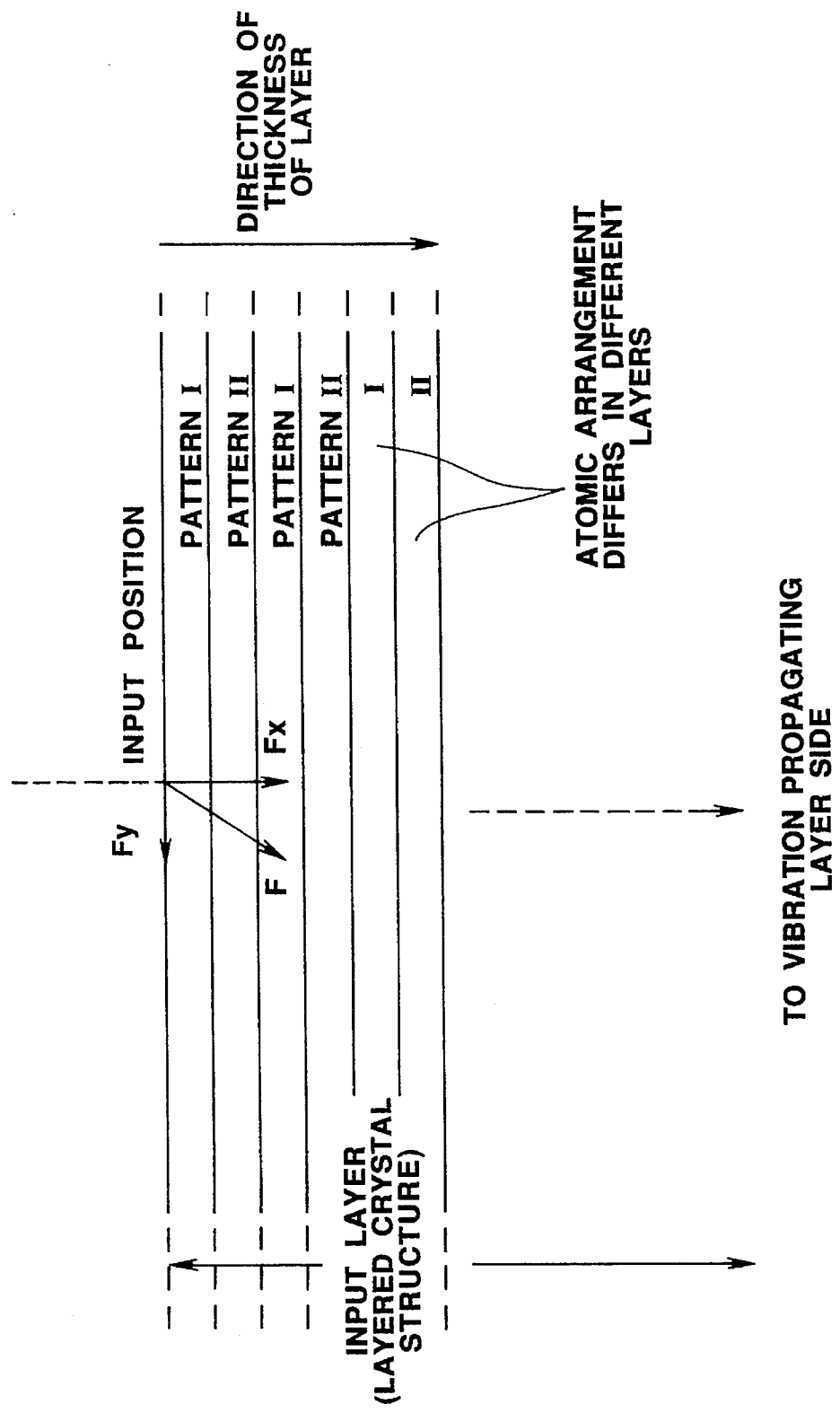
FIG. 21 is a cross-sectional view of input layer 60A of the vibration transmission plate of the sixth embodiment.
Figure 22:
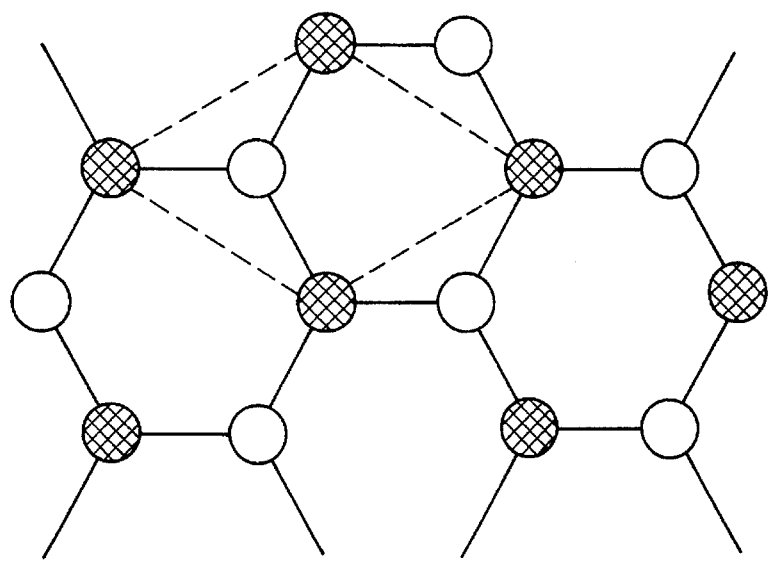
FIG. 22 is a diagram illustrating an atomic arrangement model of a material used for input later 60A of the sixth embodiment.
Figure 23:
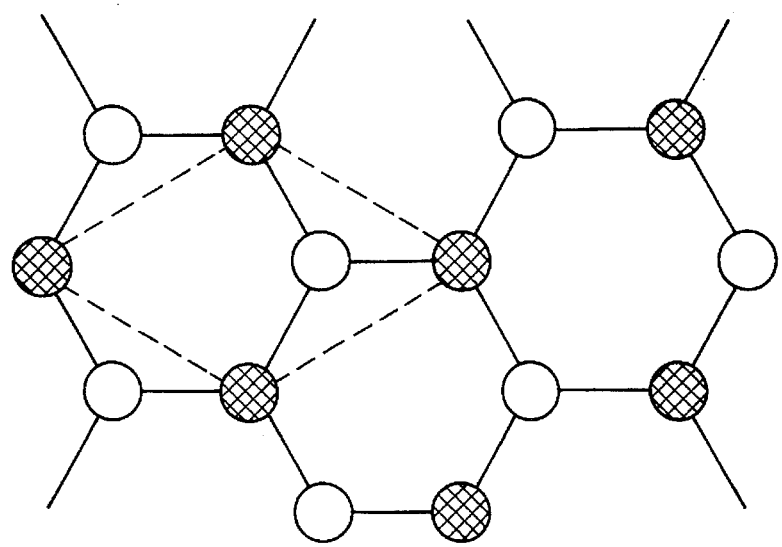
FIG. 23 is a diagram illustrating another atomic arrangement model of the material used for the input layer 60A of the sixth embodiment.

FIG. 21 is an enlarged cross-sectional view of input layer 60A. FIGS. 22 and 23 are diagrams illustrating atomic arrangements of respective layers of graphite consisting of hexagonal-system layer crystals. In input layer 60A, respective layers of the layer crystals are arranged in parallel to the plane of input layer 60A, and the layers having different atomic arrangements indicated by I and II in FIGS. 22 and 23, respectively, are alternately superposed. Since input layer 60A has a layer crystalline structure, the respective adjacent layers are bonded by the Van der Waals force. Hence, input layer 60A is easily deformed by the force component parallel to the layer (shearing force), and therefore the force-transmitting capability between layers is low. However, the force-transmitting capability is high for the force component perpendicular to the layer. Accordingly, if force vector F shown in FIG. 21 is applied to the surface of input layer 60A, force component $F_x$ perpendicular to the layer is easily transmitted, but force component $F_y$ parallel to the layer is hardly transmitted.

Accordingly, force component $F_y$ in the shearing direction input by the vibration input pen is transmitted to vibration propagating layer 60C while being reduced in the input layer, and therefore a decrease in accuracy of the detected position due to inclination of the vibration input pen can be prevented.

Alternatively, a dichalcogenide compound, such as molybdenum sulfide, tungsten sulfide or the like, may be used as a material for input layer 60A.

By coating a polycarbonate protective film on the surface of input layer 60A in order to protect input layer 60A, it is possible to improve durability.

Seventh Embodiment

Figure 24:
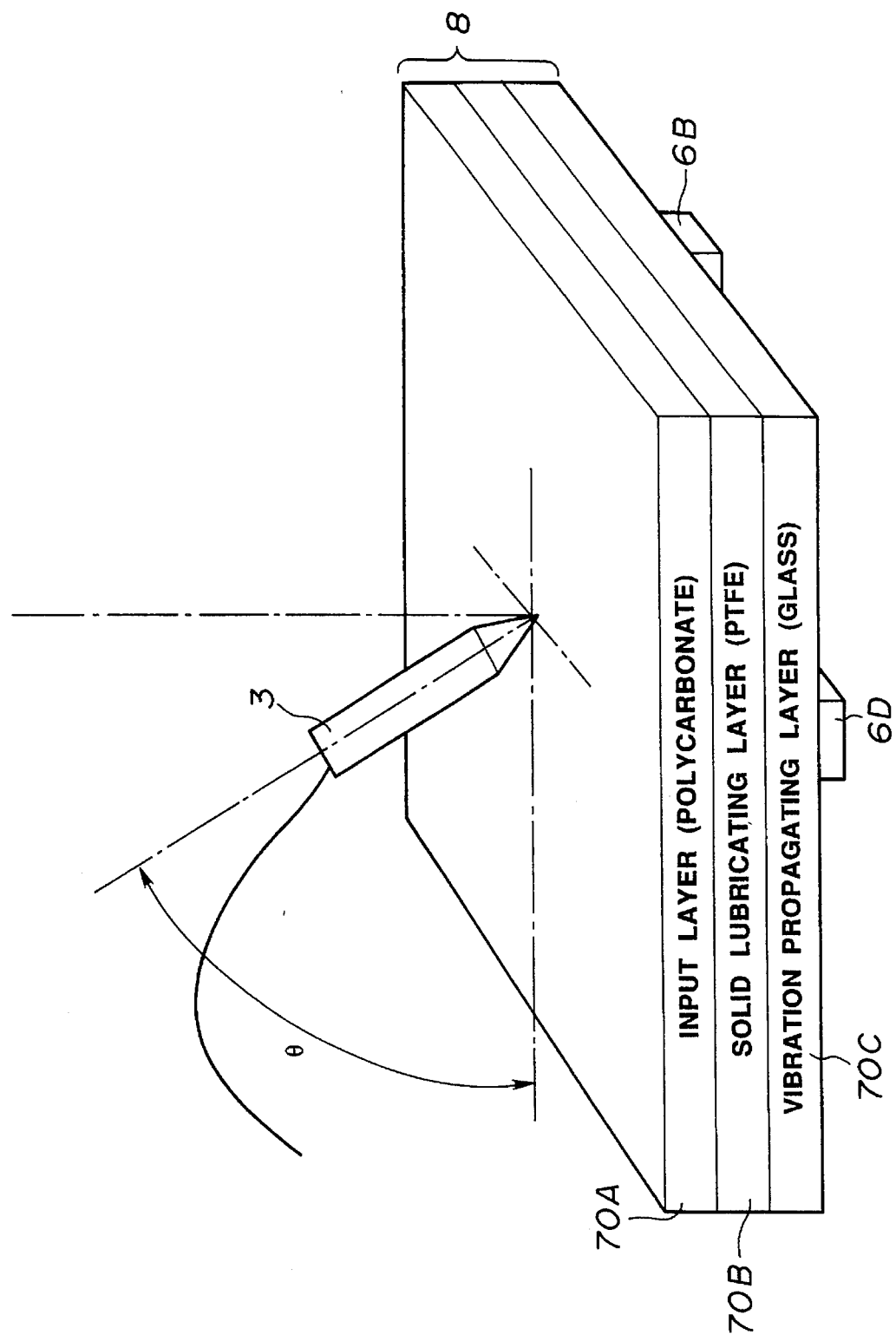
FIG. 24 is a perspective view showing the structure of a vibration transmission plate according to a seventh embodiment of the present invention.

FIG. 24 is a diagram showing the structure of a vibration transmission plate according to a seventh embodiment of the present invention. In the present embodiment, the vibration transmission plate is configured by coating solid lubricating layer 70B, comprising a PTFE (polytetrafluoroethylene) film 10 μm thick, on vibration propagating layer 70C, comprising a glass plate 1.1 mm thick, and superposing input layer 70A, comprising a polycarbonate sheet 1.0 mm thick, thereon. Sensors 6A–6D are mounted on vibration propagating layer 70C.

In the structure of the vibration transmission plate shown in FIG. 24, vibration propagating layer 70C and solid lubricating layer 70B are bonded together, while solid lubricating layer 70B and input layer 70A are not bonded. However, as illustrated in FIGS. 25 through 28, four types of structures can be considered according to at which interlayer portion an unbonded portion is to be provided. The selection of the structure type is determined by bondability and lubricity, which depend on materials for input layer 70A, solid lubricating layer 70B and vibration propagating layer 70C, and the production process of the vibration transmission plate.

Figure 25:
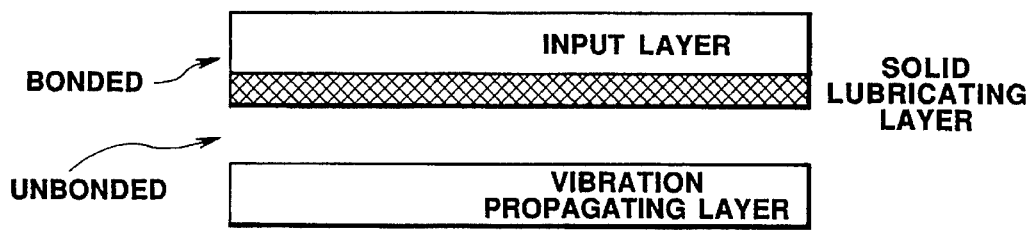
FIGS. 25 through 28 are diagrams illustrating states of bonding in the seventh embodiment.
Figure 26:
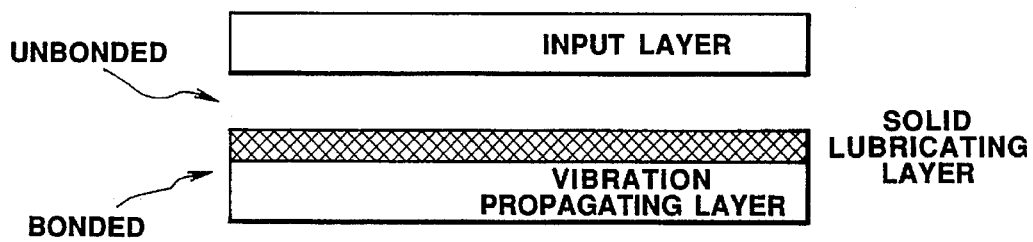
Figure 27:
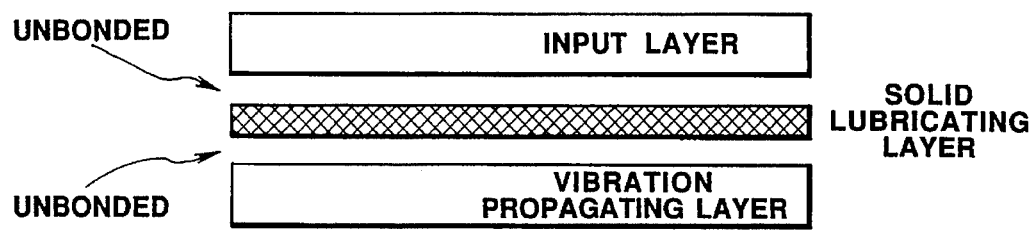
Figure 28:
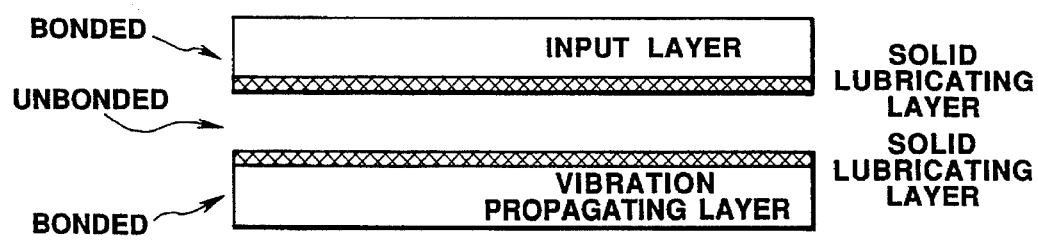

For example, in the vibration transmission plate shown in FIG. 25, a polycarbonate sheet is used as input layer 70A. From the viewpoint of uniformly forming the solid lubricating layer, the structure type shown in FIG. 28 is desirable, since it is easier to apply the PTFE film on vibration propagating layer 70C made of glass than on input layer 70A, and lubricity between the PTFE film and the polycarbonate sheet is excellent. The structure type shown in FIG. 27 may be adopted when bondability between layers is inferior although lubricity between layers is excellent. The structure type shown in FIG. 28 may be adopted when bondability between layers is excellent, while lubricity is inferior between the input layer and the solid lubricating layer and between the vibration propagating layer and the solid lubricating layer, but lubricity of the solid lubricating layer itself is excellent.

Figure 29A:
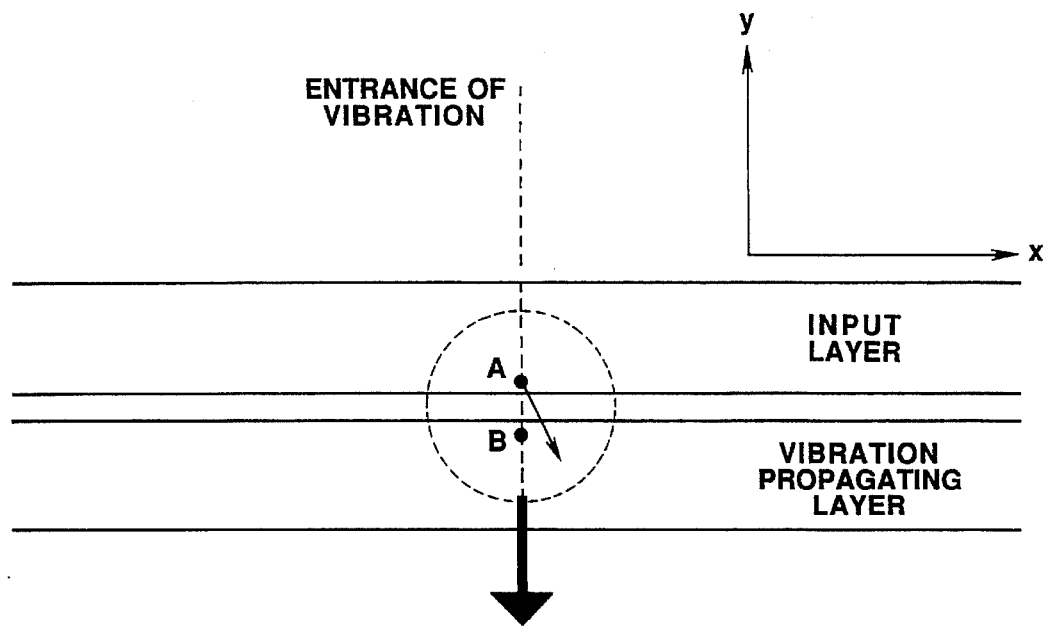
FIG. 29(a) and 29(b) are cross-sectional view showing the structure of the cross section of the vibration transmission plate of the seventh embodiment.
Figure 29B:
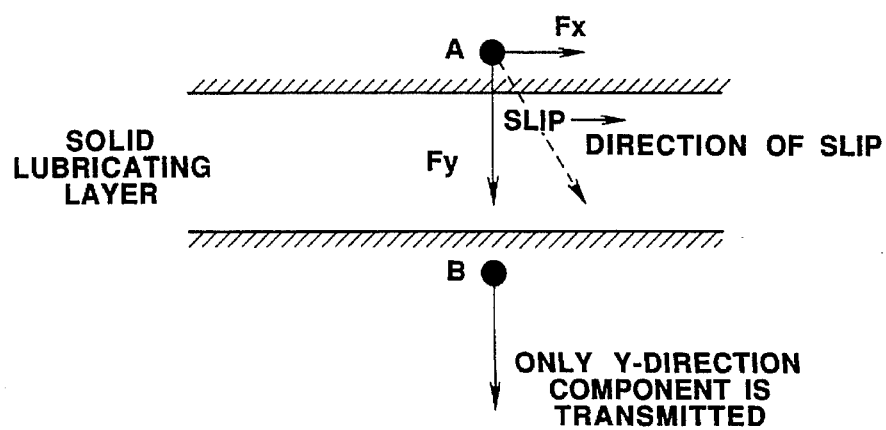

FIGS. 29(a) and 29(b) illustrate a state of vibration transmission, when vibration input pen 3 is inclined with respect to vibration transmission plate 8, in the present embodiment. When vibration input by vibration input pen 3 is incident with an angle θ with respect to a normal direction to the surface of vibration transmission plate 8, a force applied to material particle A in input layer 70A immediately below the input position by vibration input pen 3 has x-direction component $F_x$ and y-direction component $F_y$, as indicated in FIG. 29(b). If the force applied to material particle A is directly transmitted to material particle B in vibration propagating layer 70C, the behavior of vibration in vibration propagating layer 70C becomes asymmetric in the horizontal direction, and a phase delay ε is produced due to the inclination of vibration input pen 3.

In the present embodiment, by providing solid lubricating layer 70B between input layer 70A and vibration propagating layer 70C, x-direction force component Fx applied to material particle A is decreased or removed due to slip. Hence, only y-direction force component Fy can be transmitted to material particle B. As a result, the behavior of vibration in vibration propagating layer 70C becomes symmetric in the horizontal direction with respect to the input position of vibration input pen 3, and a decrease in accuracy of the detected position due to the inclination of vibration input pen 3 can be prevented.

Figure 30:
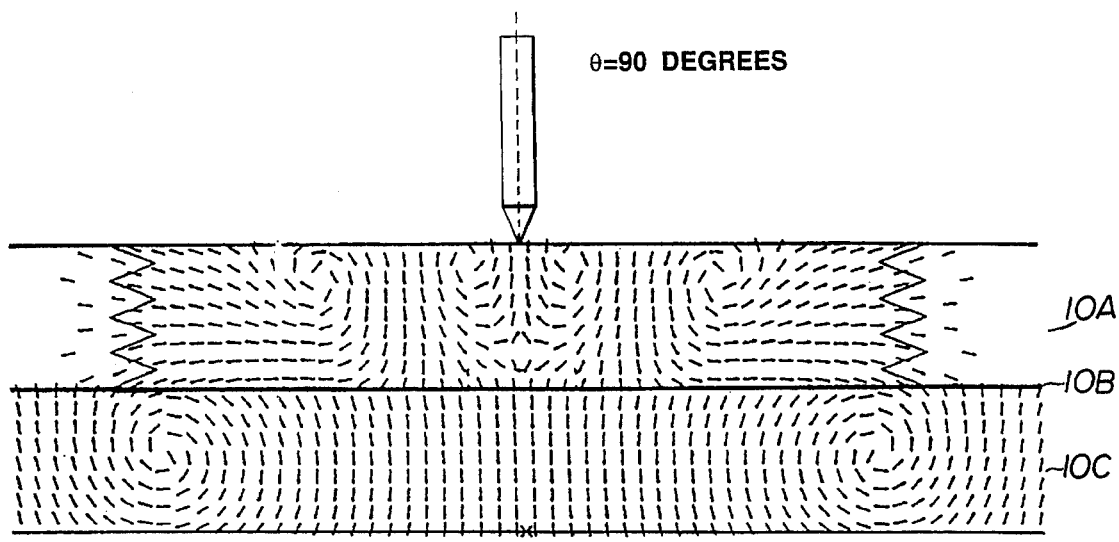
FIG. 30 is a cross-sectional view illustrating a state ($\theta=90°$) of vibration transmission in the vibration transmission plate of the seventh embodiment.
Figure 31:
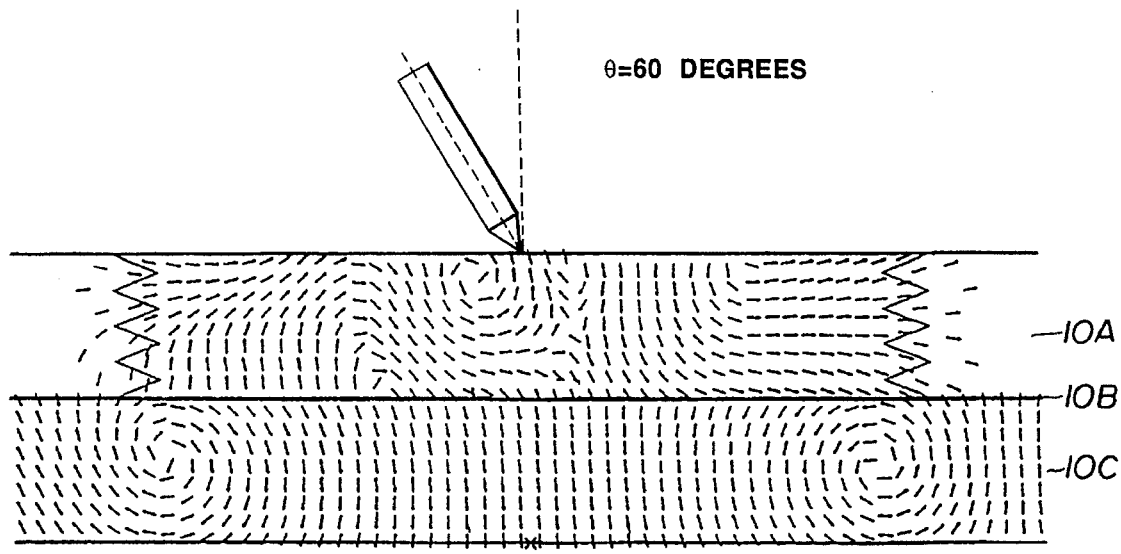
FIG. 31 is a cross-sectional view illustrating a state ($\theta=60°$) of vibration transmission in the vibration transmission plate of the seventh embodiment.

FIGS. 30 and 31 are diagrams illustrating the behavior of vibration within the cross section of vibration transmission plate 8 when vibration input pen 3 contacts vibration transmission plate 8 with angles θ=90° and 60°, respectively. In FIGS. 30 and 31, solid lubricating layer 70B is represented by a straight line, since it is thinner than input layer 70A and vibration propagaging layer 70C. From FIG. 31, it can be understood that asymmetry in the horizontal direction in the behavior of vibration produced in input layer 70A disappears in vibration propagating layer 70C due to slip between input layer 70A and solid lubricating layer 70B, and the behavior of vibration is symmetric in the horizontal direction.

Alternatively, a Langmuir-Blodgett film formed by laminating monomolecular films of higher fatty acid, higher alcohol, higher amine or the like may also be used.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A two-layer vibration transmission plate for use in a vibration input apparatus for inputting coordinates to detect vibrations input by a vibration input pen, with the vibration input apparatus having a plurality of sensors provided on said two-layer vibration transmission plate to detect the contact coordinates of the vibration input pen on said two-layer vibration transmission plate, said two-layer vibration transmission plate comprising:

an input layer for receiving the vibrations input by the vibration input pen, said input layer having a top input surface to be contacted by the vibration input pen and a bottom surface; and a vibration propagating layer in contact with said bottom surface of said input layer for propagating ultrasonic vibrations to the plurality of sensors, wherein glass is used as a material for said vibration propagating layer, and said input layer is made of a material having a flexural modulus of elasticity within a range between 180.0 and 720.0 kgf/mm².

2. A multi-layer vibration transmission plate for use in a vibration input apparatus for inputting coordinates to detect vibrations input by a vibration input pen, with the vibration input apparatus having a plurality of sensors provided on said multi-layer vibration transmission plate for detecting the contact coordinates of the vibration input pen on said multi-layer vibration transmission plate, said multi-layer vibration transmission plate comprising;

a first layer having an upper input surface for receiving vibrations from the vibration input pen and a lower surface;

a second later propagating the vibrations to the plurality of sensors; and a third layer disposed between said second layer and said first layer, wherein the respective layers are superposed so that they contact each other in an unbonded state.

3. A vibration transmission plate for inputting coordinates for identifying a position of a vibration input pen generating vibrations on said vibration transmission plate by a plurality of sensors, said vibration transmission plate comprising:

an input layer for receiving vibrations from the vibration input pen; and an intermediate layer in contact with said input layer and receiving vibrations from said input layer said intermediate layer having means for transmitting vibrations only in a predetermined direction that is orthogonal to a surface plane of said input layer.

4. A vibration transmission plate for inputting coordinates according to claim 3, further comprising a vibration propagating layer for propagating vibrations to the sensors, wherein said intermediate layer is disposed between said input layer and said vibration propagating layer.

5. A multi-layer vibration transmission plate for inputting coordinates for identifying a position of a vibration input pen generating vibrations on said multi-layer vibration transmission plate by a plurality of sensors, said multi-layer vibration transmission plate comprising:

an input layer having an upper surface for receiving vibrations from the vibration input pen and a lower surface; and a vibration propagating layer for propagating the vibrations to the plurality of sensors, said vibration propagating layer having an upper surface contacting said lower surface of said input layer at contact portions, wherein one of said lower surface of said input layer and said upper surface of said vibration propagating layer has a pointed contact surface for contacting the other surface at said contact portions.

6. A vibration transmission plate for inputting coordinates according to claim 5, further comprising semitransparent marks for indicating point-contact positions for inputting coordinates disposed on said upper surface of said input layer.

7. A multi-layer vibration transmission plate for inputting coordinates to identify a position of a vibration input pen generating vibrations on said multi-layer vibration transmission plate by detecting the vibrations with a plurality of sensors, said multi-layer vibration transmission plate comprising:

an input layer for receiving the vibrations from the vibration input pen;

a vibration propagating layer for propagating the vibrations to the sensors; and an intermediate layer, disposed between said input layer and said vibration propagating layer, for transmitting the vibrations input to said input layer to said vibration propagating layer, wherein said intermediate layer comprises a plurality of polygonal units arranged in a plane so as to provide cavities between said input layer and said vibration propagating layer.

8. A vibration transmission plate for inputting coordinates to identify a position of a vibration input pen generating vibrations on said vibration transmission plate by detecting the vibrations with a plurality of sensors, said vibration transmission plate comprising:

an input layer for receiving vibrations from the vibration input pen; and a vibration propagating layer for propagating the vibrations to the plurality of sensors, wherein said input layered uses a material whose crystalline structure is a layer structure.

9. A multi-layer vibration transmission plate for inputting coordinates to identify a position of a vibration input pen generating vibrations on said multi-layer vibration transmission plate by detecting the vibrations with a plurality of sensors, said multi-layer vibration transmission plate comprising:

an input layer for receiving vibrations from the vibration input pen;

a vibration propagating layer for propagating the vibrations to the plurality of sensors; and a solid lubricating layer, disposed between said input layer and said vibration propagating layer, for transmitting the vibrations between said input layer and said vibration layer.

10. A vibration transmission plate for inputting coordinates according to claim 9, wherein said input layer and said solid lubricating layer are bonded together, and said solid lubricating layer and said vibration propagating layer are not bonded together.

11. A vibration transmission plate for inputting coordinates according to claim 9, wherein said vibration propagating layer and said solid lubricating layer are bonded together, and said solid lubricating layer and said input layer are not bonded together.

12. A vibration transmission plate for inputting coordinates according to claim 9, wherein said input layer, said solid lubricating layer and said vibration propagating layer are not bonded to each other.

13. A vibration transmission plate for inputting coordinates according to claim 9, wherein said solid lubricating layer comprises a two-layer structure, with a first layer bonded to said input layer and a second layer bonded to said vibration propagating layer, and wherein said first layer and said second layer are not bonded to each other.

14. A multi-layer vibration transmission device for detecting vibrations input by a vibration input pen, comprising:

a first layer having an upper surface for receiving vibrations from the vibration input pen and a lower surface;

a second layer receiving the vibrations transmitted through said first layer; and a third layer disposed between said second layer and said first layer for transmitting the vibrations between said first layer and said second layer; and a plurality of sensors disposed on said second layer for detecting the vibrations.

15. A vibration transmission device, comprising:

an input layer for receiving vibrations from a vibrating input pen;

an intermediate layer in contact with said input layer for receiving vibrations from said input layer, said intermediate layer having means for transmitting the vibrations only in a predetermined direction that is orthogonal to a surface plane of said input layer;

a vibration propagating layer in contact with said intermediate layer for receiving vibrations from said intermediate layer; and a plurality of sensors secured on said vibration propagating layer for detecting the vibrations.

16. A vibration transmission device, comprising:

an input layer for receiving vibrations from a vibration input pen;

a vibration propagating layer for propagating the vibrations;

a solid lubricating layer, disposed between said input layer and said vibration propagating layer, for transmitting the vibration between said input layer and said vibration propagating layer; and a plurality of sensors disposed on said vibration propagating layer for detecting the vibrations.

17. A vibration transmission device according to claim 16, wherein said input layer and said solid lubricating layer are bonded together, and said solid lubricating layer and said vibration propagating layer are not bonded together.

18. A vibration transmission device according to claim 16, wherein said vibration propagating layer and said solid lubricating layer are bonded together, and said solid lubricating layer and said input layer are not bonded together.

19. A vibration transmission device according to claim 16, wherein said input layer, said solid lubricating layer and said vibration propagating layer are not bonded to each other.

20. A vibration transmission device according to claim 16, wherein said solid lubricating layer comprises a two-layer structure, with a first layer bonded to said input layer and a second layer bonded to said vibration propagating layer, and wherein said first layer and said second layer are not bonded to each other.

* * * * *

UNITED STATES PATENT AND TRADEMARK OFFICE
CERTIFICATE OF CORRECTION

PATENT NO. : 5,491,305  Page 1 of 2
DATED : February 13, 1996
INVENTOR(S) : Kawakami et al.

It is certified that error appears in the above-indentified patent and that said Letters Patent is hereby corrected as shown below:

On the title page item,
[57] ABSTRACT:

Line 2, "coodinates" should read --coordinates--.

COLUMN 6:

Line 19, "e" should read --$\epsilon$--.

COLUMN 7:

Line 27, "0.77 mm" should read --0.7 mm--.

COLUMN 13:

Line 15, "later" should read --layer--.
Line 28, "layer" should read --layer,--.
Line 55, "semitransparent" should read --semi-transparent--.

COLUMN 14:

Line 21, "layer" should read --layered--.
Line 20, "layered" should read --layer--.

UNITED STATES PATENT AND TRADEMARK OFFICE
CERTIFICATE OF CORRECTION

PATENT NO. : 5,491,305
DATED : February 13, 1996
INVENTOR(S) : Kawakami et al.

It is certified that error appears in the above-indentified patent and that said Letters Patent is hereby corrected as shown below:

<u>COLUMN 15</u>:

Line 22, "vibration" should read --vibrations--.

Signed and Sealed this

Twenty-seventh Day of August, 1996

Attest:

BRUCE LEHMAN

*Attesting Officer*     *Commissioner of Patents and Trademarks*